United States Patent
Mather

(10) Patent No.: US 11,474,796 B1
(45) Date of Patent: Oct. 18, 2022

(54) BUILD SYSTEM FOR DISTRIBUTED APPLICATIONS

(71) Applicant: Elements Dev Corporation, San Francisco, CA (US)

(72) Inventor: Christopher Douglas Mather, San Francisco, CA (US)

(73) Assignee: Elements Dev Corporation, San Francisco, CA (US)

( * ) Notice: Subject to any disclaimer, the term of this patent is extended or adjusted under 35 U.S.C. 154(b) by 0 days.

(21) Appl. No.: 16/924,420

(22) Filed: Jul. 9, 2020

Related U.S. Application Data

(60) Provisional application No. 62/871,994, filed on Jul. 9, 2019.

(51) Int. Cl.
*G06F 9/44* (2018.01)
*G06F 8/41* (2018.01)
*G06F 8/77* (2018.01)

(52) U.S. Cl.
CPC .............. *G06F 8/427* (2013.01); *G06F 8/433* (2013.01); *G06F 8/77* (2013.01)

(58) Field of Classification Search
CPC ........................................................ G06F 8/20
USPC ......................................................... 717/101
See application file for complete search history.

(56) References Cited

U.S. PATENT DOCUMENTS

| | | | | |
|---|---|---|---|---|
| 7,478,142 B1* | 1/2009 | Veditz | ...................... | G06F 9/445 709/218 |
| 8,745,579 B2* | 6/2014 | Johnson, Jr. | .............. | G06F 8/51 717/106 |
| 9,223,815 B2* | 12/2015 | Teraguchi | ........... | G06F 11/0709 |
| 9,471,546 B2* | 10/2016 | Speek | ...................... | G06F 40/00 |
| 9,678,720 B2* | 6/2017 | Hale | .......................... | G06F 8/74 |
| 10,331,432 B2* | 6/2019 | Oliver | ....................... | G06F 8/65 |
| 10,585,710 B2* | 3/2020 | Smith | ................. | G06F 9/45558 |
| 10,678,910 B2* | 6/2020 | Ng | ....................... | H04L 63/1466 |
| 11,023,426 B1* | 6/2021 | Tkachuk | ................... | G06F 8/71 |
| 11,057,500 B2* | 7/2021 | Aragon | .................. | H04L 67/02 |
| 2013/0297579 A1* | 11/2013 | Andrew | ..................... | G06F 8/71 707/698 |
| 2014/0047413 A1* | 2/2014 | Sheive | ...................... | G06F 8/30 717/110 |

(Continued)

OTHER PUBLICATIONS

Istva'n-Attila Csa'Sza'r et al. "Interactive call graph generation for software projects"; 2020 IEEE 16th International Conference on Intelligent Computer Communication and Processing (ICCP)—Nov. 26, 2020 IEEE.*

(Continued)

*Primary Examiner* — Francisco J Aponte
(74) *Attorney, Agent, or Firm* — Davis Wright Tremaine LLP

(57) ABSTRACT

The present disclosure describes a method and system for generating and managing software builds for distributed applications includes scanning the source project folder to generate a source graph representing file dependencies within the source folder; compiling the one or more files in the source project folder to generate compiled code for each of the plurality of targets using the source graph; linking and writing the compiled code as linked files or written files for one or more of the plurality of targets; and writing the distribution manifest file to a build directory, the distribution manifest file including the linked or written files.

20 Claims, 19 Drawing Sheets

(56) References Cited

U.S. PATENT DOCUMENTS

| | | | |
|---|---|---|---|
| 2015/0186132 A1* | 7/2015 | Oliveri | G06F 8/34 717/120 |
| 2015/0215375 A1* | 7/2015 | Hundt | H04L 67/02 709/203 |
| 2016/0070813 A1* | 3/2016 | Unter Ecker | G06F 3/0484 715/234 |
| 2016/0103586 A1* | 4/2016 | Greenberg | G06F 3/0488 715/739 |
| 2016/0149987 A1* | 5/2016 | Thompson | H04L 69/08 709/217 |
| 2016/0321055 A1* | 11/2016 | Mihalcea | G06F 8/63 |
| 2017/0046135 A1* | 2/2017 | Hazarika | G06F 9/541 |
| 2017/0097814 A1* | 4/2017 | Norskov | G06F 8/447 |
| 2017/0109142 A1* | 4/2017 | Kaushal | H04W 4/18 |
| 2018/0137035 A1* | 5/2018 | Magre | G06F 11/3692 |
| 2019/0065217 A1* | 2/2019 | Girdhar | G06F 8/34 |
| 2019/0095196 A1* | 3/2019 | Anderson | G06F 8/71 |
| 2019/0138582 A1* | 5/2019 | Cudich | G06F 40/166 |
| 2019/0179620 A1* | 6/2019 | Lowery | G06F 11/0709 |
| 2019/0188006 A1* | 6/2019 | Ritter | G06F 8/38 |
| 2019/0243629 A1* | 8/2019 | Gass | G06F 8/40 |
| 2019/0317982 A1* | 10/2019 | Chitale | G06F 40/186 |
| 2020/0019414 A1* | 1/2020 | Byard | G06F 21/629 |
| 2020/0125345 A1* | 4/2020 | Belagali | G06F 8/34 |
| 2020/0192662 A1* | 6/2020 | Hu | G06F 8/427 |
| 2020/0218516 A1* | 7/2020 | Hari Krishnan | G06F 8/38 |
| 2020/0249921 A1* | 8/2020 | Giandomenico | G06F 8/10 |
| 2020/0257515 A1* | 8/2020 | Totale | H04L 67/34 |
| 2020/0264848 A1* | 8/2020 | Stober | G06F 8/36 |
| 2020/0278845 A1* | 9/2020 | Ravid | G06F 8/38 |

OTHER PUBLICATIONS

Theo Beffart et al. "RootJS: Node.js Bindings for ROOT 6"; IOP Conf. Series: Journal of Physics: Conf. Series 898 (2017) 072028-2017.*

* cited by examiner

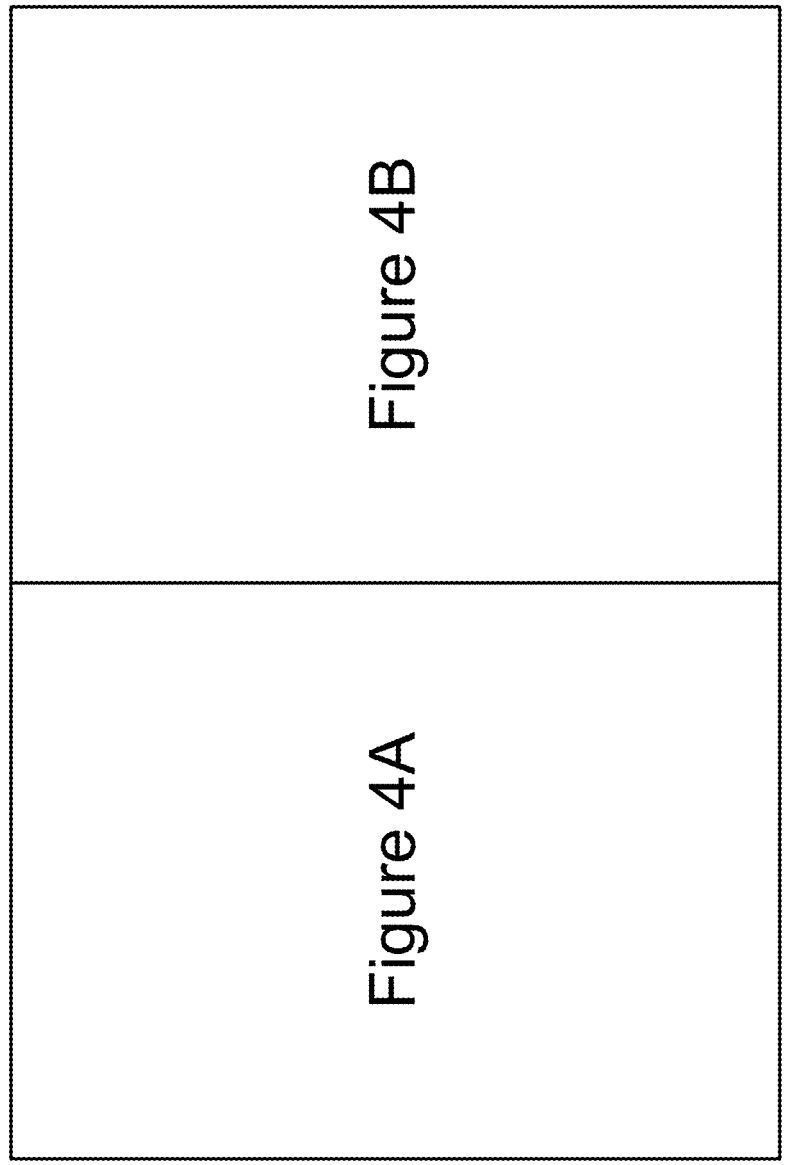

BUILD SYSTEM FOR DISTRIBUTED APPLICATIONS

CROSS REFERENCE TO RELATED APPLICATIONS

This application claims the benefit of U.S. Provisional Patent Application No. 62/871,994, entitled "BUILD SYSTEM FOR DISTRIBUTED APPLICATIONS" filed Jul. 9, 2019, the entire contents of which are herein incorporated by reference.

FIELD OF THE INVENTION

The present disclosure relates generally to systems and methods for generating and managing software builds for distributed applications. In particular, the present disclosure relates to a build system capable of generating code for a multiple number of distributed build targets for an application from a single source graph.

BACKGROUND OF THE DISCLOSURE

In software development, the term build refers to the process of converting source code in human-readable programming languages into standalone software artifacts (e.g., binaries or executable program) that can be run on a computing device. Typically, a system, e.g., a build tool or a build utility, builds an application for only one target. For example, the popular open source build tool WebPack is usually used to build client-side applications consisting only of browser code. Existing prior art client build tools can only build software applications for a single target such as a client-side application. If you need to build the same software application for a server as well, then you need to re-run the build tool with a number of different inputs and parameters. Similarly, if you change any aspects of a particular program, the build needs to be redone for every target.

Today many applications, however, are distributed applications that require software builds to be generated across a number of different targets. For example, a distributed application, like a web application, can contain code that executes on a server as well as in a browser client.

SUMMARY

The techniques introduced herein overcome the deficiencies and limitations of the prior art at least in part by providing systems and methods for generating and managing software builds for distributed applications.

According to one innovative aspect of the subject matter described in this disclosure, a method for generating and managing software builds for distributed applications is provided. The method includes receiving, with a computing device, a request to create a software application for a plurality of targets from a source project folder including one or more source files; scanning, with the computing device, the source project folder to generate a source graph representing file dependencies within the source folder; compiling, with the computing device, the one or more files in the source project folder to generate compiled code for each of the plurality of targets using the source graph; linking and writing, with the computing device, the compiled code as linked files or written files for one or more of the plurality of targets; and writing, with the computing device, the distribution manifest file to a build directory, the distribution manifest file including the linked or written files.

According to another innovative aspect of the subject matter described in this disclosure, a system for generating and managing software builds for distributed applications is provided. The system includes a processor; and a memory storing instructions that, when executed, cause the system to perform operations comprising: receiving a request to create a software application for a plurality of targets from a source project folder including one or more source files; scanning the source project folder to generate a source graph representing file dependencies within the source folder; compiling the one or more files in the source project folder to generate compiled code for each of the plurality of targets using the source graph; linking and writing the compiled code as linked files or written files for one or more of the plurality of targets; and writing the distribution manifest file to a build directory, the distribution manifest file including the linked or written files.

Other implementations of one or more of these aspects and other aspects include corresponding systems, apparatus, and computer programs, configured to perform the various action and/or store various data described in association with these aspects. Numerous additional features may be included in these and various other implementations, as discussed throughout this disclosure.

These and other implementations may each optionally include one or more of the following features. For instance, features may include the plurality of targets include one browser target and one server target, the source project folder is a single code source tree, the source project folder includes all source files needed to generate the application software for all the plurality of targets, the source graph has multiple edges for maintaining multiple target dependencies and import redirects, or the scanning is performed using a dependency parser that parses only dependency statements in code in the source project folder. For example, features include scanning the source project folder to generate a source graph includes crawling the source files in parallel for each target using a shared queue, compiling the one or more files in the source project folder to generate compiled code includes running an abstract syntax tree transform for the one or more files in the source project folder, wherein compiling files in the source project folder to generate compiled code is done automatically in topological order, and wherein, wherein compiling is performed using a pluggable compiler framework. Still another feature includes creating at least one bundle for one of the of the plurality of targets by determining resources for loading the application, automatically splitting the application into pages; and creating a bundle for each of the pages. Other features may include watching source files for changes monitoring for file change event; performing a diff of files in a virtual file tree against files stored on disk; and generating file change events for each changed file. Yet other features may include performing a diff of files in the distribution manifest file with files in a loader cache to determine changed files; deleting all changed files from loader cache; and reloads changed files without restarting process.

It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIGS. 4, 4A and 4B are a diagram of a first implementation of a source graph used by the system in accordance with the present disclosure.

Figure 13C:
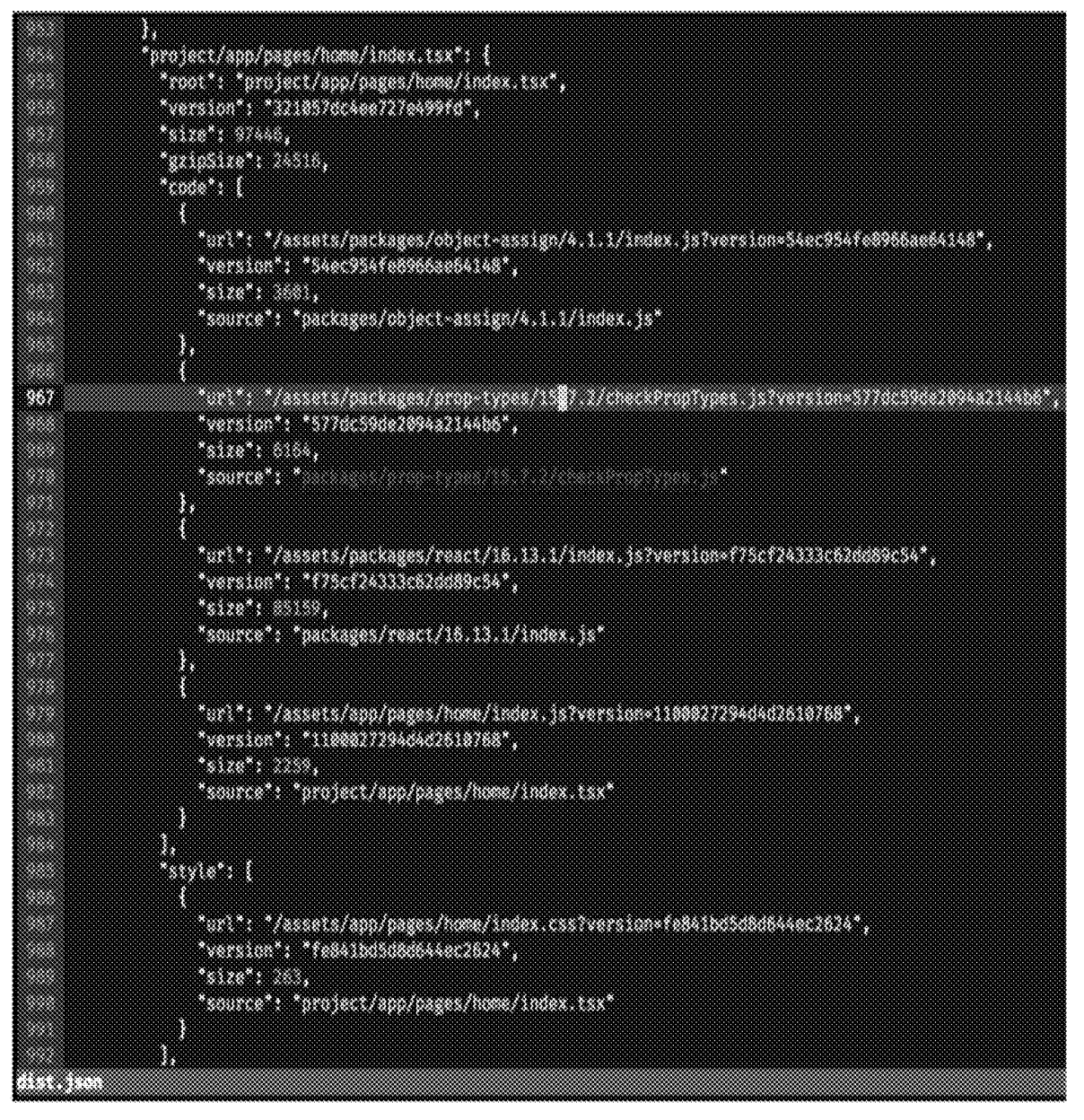

FIGS. 13A-13D are graphic representations of example portions of a distribution manifest file presented in a user interface of the build system in accordance with the present disclosure.

DETAILED DESCRIPTION

As set forth in detail below, the technology described herein provides a build system 106 for distributed applications. The build system 106 of the present disclosure is build software that efficiently builds software applications distributed across a plurality of targets 110. For example, the build system 106 can take a source project folder, including a plurality of source code files, and produce a software build for multiple targets 110 including, for example, server, browser, and possibly others like a terminal or mobile client. In some implementations, the disclosed build system 106 builds software for multiple targets 110 is particularly advantageous for use in building distributed applications, like a web application, that contains code that executes on a server and in a browser client.

Figure 1:
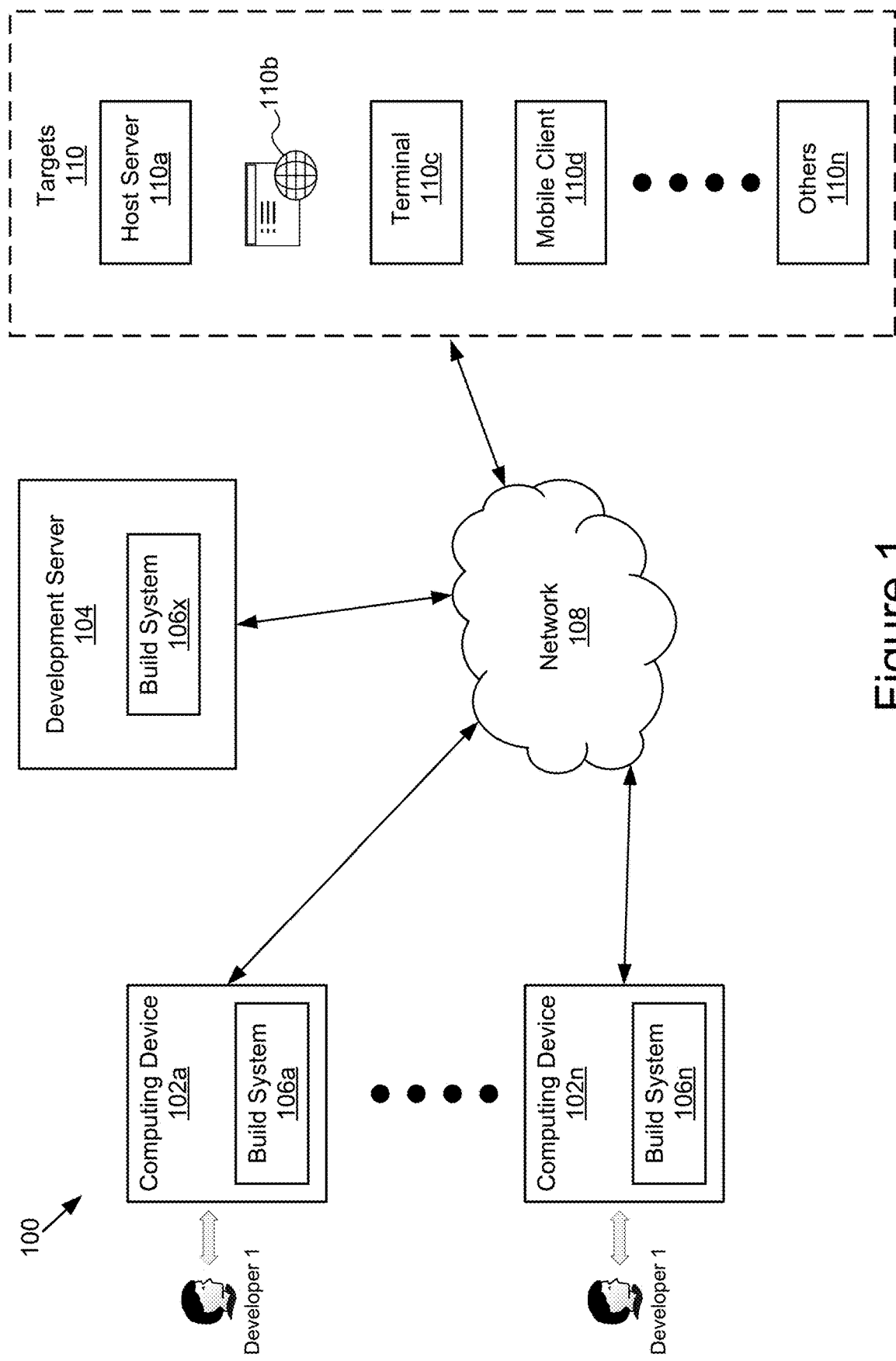
FIG. 1 is a block diagram of one implementation of a system for building distributed applications in accordance with the present disclosure.

As shown in FIG. 1, the system 100 comprises one or more developer computing devices 102a-102n each having a build system 106a-106n, a development server 104 having the build system 106x, a network 108 and a plurality of targets 110. The one or more developer computing devices 102a-102n, or the development server 104 communicates via the network 108 with the plurality of targets 110 to distribute and install the same application on the plurality of targets 110 despite the differences in the targets 110. As depicted, one or more developer computing devices 102a-102n, the development server 104, and the plurality of targets 110 are coupled for communication and interaction with each other by the network 108.

While a plurality of build systems 106a-106n, 106x are illustrated by way of example in FIG. 1, it should be understood that the present disclosure only needs a single build system 106 to be operational. For example, a single developer using computing device 102a including build system 106a could perform the operations that will be described below. Similarly, any number of additional developers may interact with their corresponding computing systems 102 that include the build system 106. Finally, the build system 106x may be operational on the development server 104 for use by multiple users remotely.

The one or more developer computing devices 102a-102n may be any computing device that includes hardware, software, and/or firmware that support the functionality described herein. For example, the one or more developer computing devices 102a-102n may have components similar to those described below in FIG. 5 including a process, a memory, an input device, an output device, data storage, a memory and a communication unit. In one implementation, the one or more developer computing devices 102a-102n are coupled to the development server 104 via the network 108 for interacting with their respective build system 106a-106n to provide inputs and commands as will be described below to builds software applications distributed to the plurality of different targets 110.

The development server 104 is may be any computing device that includes hardware, software, and/or firmware that support the functionality described herein. Similarly, the development server 104 may have components similar to those described below in FIG. 5 including a process, a memory, an input device, an output device, data storage, a memory and a communication unit. In one implementation, the development server 104 is a server implemented in the cloud (not shown). As shown in FIG. 1, in one implementation the development server 104 includes the build system 106x. One implementation of the development server 104 will be described in more detail below with reference to FIG. 5. One implementation of the build system 106 will be described in more detail below with reference to FIG. 2 below. In some implementations, not only does the build system 106 generate software builds for a plurality of build targets 110, but also the build system 106 provides better performance than existing build tools, despite having more to do, e.g. provide code for multiple targets. In some implementations, to achieve better performance (e.g., less time) as existing build tools, the build system 106 can be configured to scan the source files of a source project folder into a source graph 220, compile the source files 202 for each target 110 of a plurality of build targets, link source code and stylesheets into a plurality of combined asset files, and prepare an application for distribution. The details of such for formants will be described in more detail below.

The network 108 can be a conventional type, wired or wireless, and may have numerous different configurations including a star configuration, token ring configuration or other configurations. Furthermore, the network 108 may include a local area network (LAN), a wide area network (WAN) (e.g., the Internet), and/or other interconnected data paths across which multiple devices may communicate. In some implementations, the network 108 may be a peer-to-peer network. The network 108 may also be coupled to or include portions of a telecommunications network for sending data in a variety of different communication protocols. In some implementations, the network 108 may include Bluetooth communication networks or a cellular communications network for sending and receiving data including via short messaging service (SMS), multimedia messaging service (MMS), hypertext transfer protocol (HTTP), direct data connection, wireless application protocol (WAP), email, etc.

As shown in FIG. 1, the system 100 includes the plurality of targets 110. The targets 110 shown in FIG. 1 are merely an example of what different targets 110 may be and the system 100 may include a host server 110a, a web browser 110b, a terminal 110c, a mobile client 110d, or any other computing device or platform 110n. The plurality of targets 110 can be any suitable type of microprocessor-based device, such as a personal computer, workstation, server, or handheld computing device, such as a phone or tablet, etc. It should be understood that the build system 106 of the present disclosure is particularly advantageous because it is able to generate the software build for a distributed application across the plurality of targets 110. Although FIG. 1 shows a host server 110a, a web browser 110b, a terminal 110c, a mobile client 110d, and the other computing device or platform 110n, it should be recognized that different implementations of the system may include any two or more of the targets 110 shown in FIG. 1.

Figure 2A:
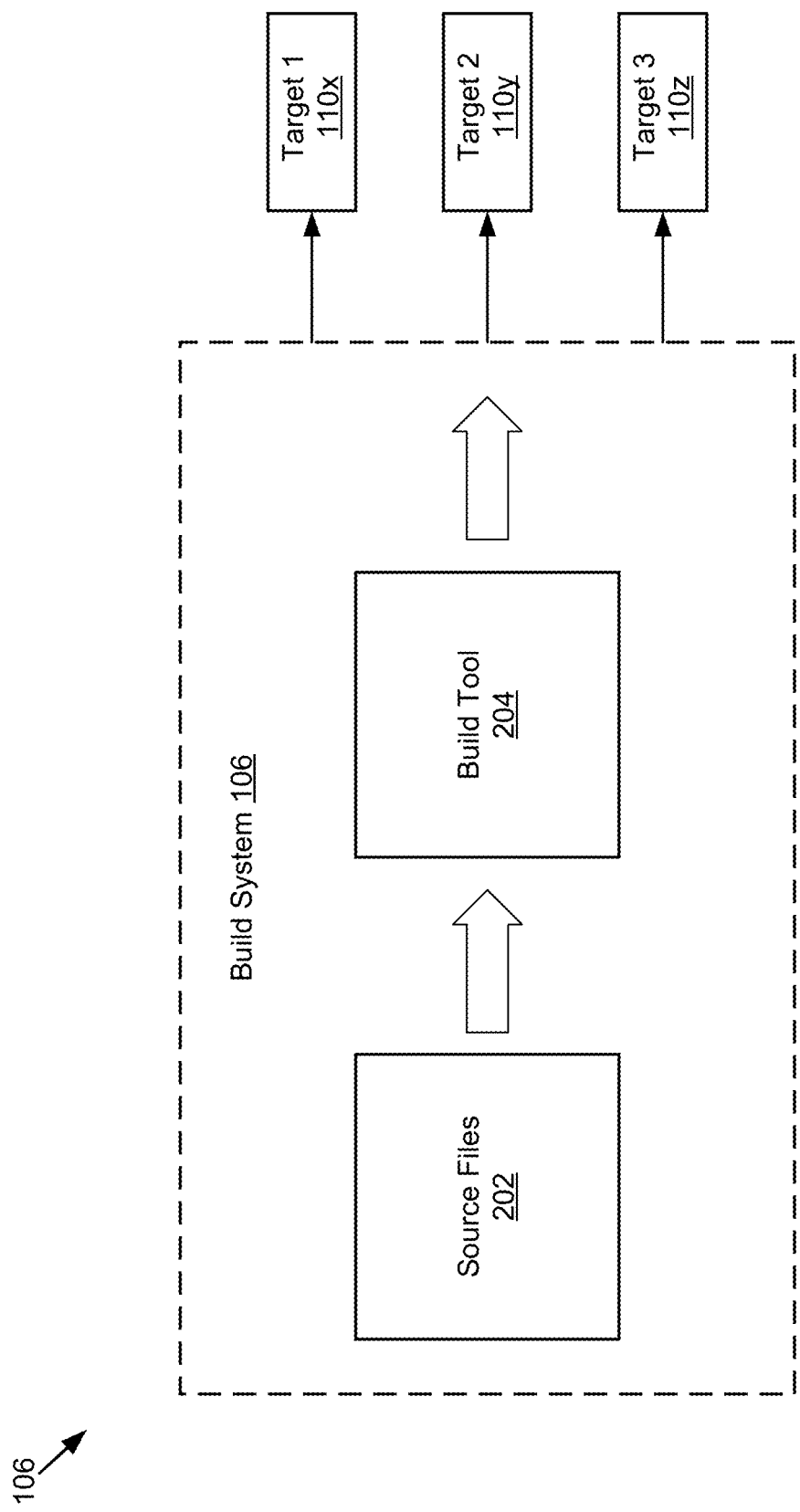
FIGS. 2A and 2B are a block diagrams of one implementation of a system for building distributed applications including a build tool in accordance with the present disclosure.
Figure 2B:
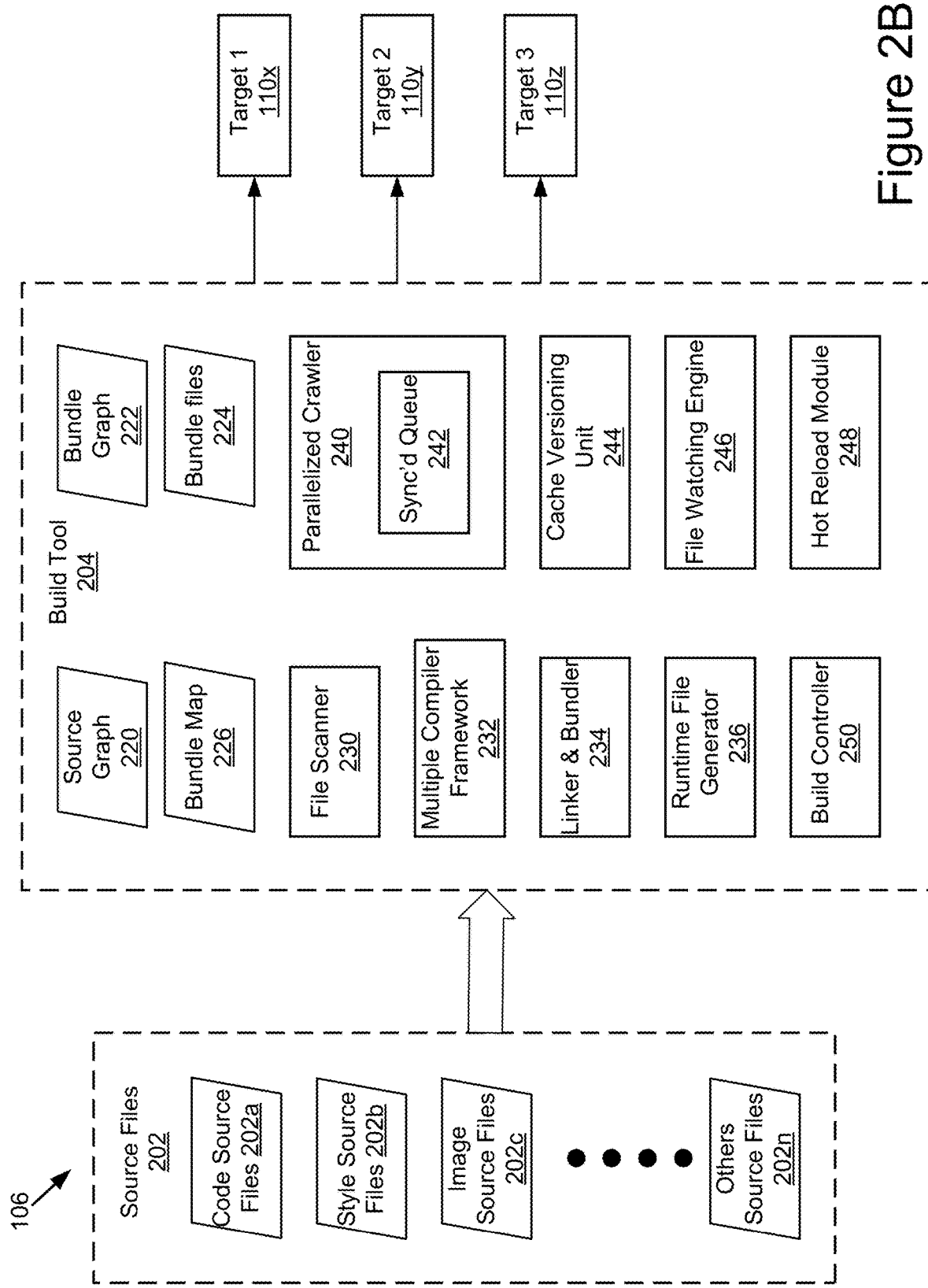

Referring now to FIGS. 2A and 2B, one implementation for the build system 106 is shown. As shown in FIG. 2A, the build system 106 includes storage for source files 202, and a build tool 204. Users may store the source files 202 in a folder or other mechanism for access by the build tool 204. FIG. 2A shows how the development server 104 receives source files 202, provides them to the build tool 204 which in turn processes the source files 202 to generate the application code that is provided to and run on the example targets, target 1 110x, target 2 110y and target three 110z. FIG. 2 shows three targets only by way of example and the build tool 204 may provide specific code for any number of targets greater than 2. The build tool 204 is configured and coupled to distribute and install the distributed application on the targets 110. In one implementation, users/developers use the build tool 204 to compile, link, bundle, and prepare their application for delivery over the web. For example, the tool is used at a command line like this:

cd ~/src/project elements build

In one implementation, users/developers run the build tool 204 in their project directory.

The output of the build tool 204 are the compiled, linked and bundled assets, and a few additional runtime files to help server and browser applications use the build output (i.e., dist.json, bundles.js, loader.js files). Unlike other build tools, the build tool 204 must work for a plurality (i.e. two or more) of targets 110. For example, given a single source code tree, the build tool 204 must compile the code for both the server and the browser. The build tool 204 supports changing import path resolutions depending upon the build target 110. The changing import path resolutions, redirects, may be manually specified by a developer using a developer computing device 102 or automatically by the build tool 204. Once the redirects have been specified, the build tool 204 follows redirects when linking code source files 202a or style source files 202b together. The redirect specifications can be done for a project, or a package that is used in a project. Whether in the project or in a package, the redirect is specified in a package.json file. An example looks like this:

```
""
{
    "browser":{
        "./server-file s": "./browser-file-instead.js"
    }
}
""
```

In the example above, if code imports "server-file.js", for the browser build target that file will be replaced with "browser-file-instead.js". For example, the user might want to exclude the "database" code from the browser target. The build tool 204 supports all build targets and is additionally very fast. It is currently the fastest build tool in existence that accomplishes all of these goals.

Referring also now to FIG. 2B, the source files 202 include code source files 202a (sometimes refer to herein as "source code"), style source files 202b (sometimes refer to herein as "style files" or "stylesheets"), image source files 202c, and any other content that may be utilized by software created by the build tool 204 and used in execution of the software by a target 110. In some implementations, the source files 202 are imported into the build tool 204 and stored as a single code source tree (or source project folder or project directory tree) or stored on the developer's computing device 102 and accessed directly by the build tool 204. The inputs to the build tool 204 are the source files 202 e.g., all the files in the single code source tree. In one implementation, the single code source tree may be organized as:

project/
        app/
            index.ts
            views
        home/
            home.tsx
            home.scss As shown above, the single code source tree can include a plurality of source code files (e.g., index.ts, home.tsx, and home.scss). In some implementations, a user can run the build tool 204 on the source project folder to build an application (e.g., a built folder including one or more build targets) that can be executed as a web application using a Node.js or another runtime environment. For example, a web application consists of two build targets: (1) Node.js server and (2) browser. It should be understood that the one source folder includes all the source files 202 needed to generate the application software for all the plurality of targets. For example, if there are 3 targets that each require different source files 202 such as code source files 202a, style source files 202b, image source files 202c or other source files 202n, the source folder includes any needed code source files 202a, style source files 202b, image source files 202c or other source files 202n that are needed for each target. More specifically, if a first target requires a first image format, but a second target required a second, different image format, the source folder includes 2 files: one with the image in the first image format and a second one with the image in the second images format. This is merely an example, and in some implementations, the source folder includes all the files of source files 202 need for all the plurality of targets.

The build tool 204 comprises a source graph 220, one or more bundle graphs 222, a file scanner 230, a multiple compiler framework 232, a linker & bundler 234, a runtime file loader 236, a parallelized crawler 240 including a synced queue 242, a cache versioning unit 244, a file watching engine 246, a hot reload module 248, and a build controller 250. These components can be operational on any one of the computing devices 102a-102n, or the development server 104 and their functionality is described below and their operation in FIGS. 6-12. As noted above, the build tool 204 receives the source files 202 and then generates, one or more build asset files for each respective target 110. These components interact with each other to generate a build for each target 110 under the control of the build controller 250 that manages these components and their interaction. The operation of the build tool 204 will be described below with respect to these components.

The components of the build tool 204 will now be described in more detail. In some implementations, the file scanner 230, the multiple compiler framework 232, the linker & bundler 234, the runtime file loader 236, the parallelized crawler 240, the cache versioning unit 244, the file watching engine 246, the hot reload module 248, and the build controller 250 are sets of instructions executable by the processor 502 to provide their respective acts and/or functionality. In other implementations, the file scanner 230, the multiple compiler framework 232, the linker & bundler 234, the runtime file loader 236, the parallelized crawler 240, the cache versioning unit 244, the file watching engine 246, the hot reload module 248, and the build controller 250 are stored in the memory 504 of the development server 104 and are accessible and executable by the processor 502 to provide their respective acts and/or functionality. In any of these implementations, the file scanner 230, the multiple compiler framework 232, the linker & bundler 234, the runtime file loader 236, the parallelized crawler 240, the cache versioning unit 244, the file watching engine 246, the hot reload module 248, and the build controller 250 may be adapted for cooperation and communication with the processor 502 and other components 502, 504, 506, 508, 510 and 512 (see FIG. 5).

Figure 4A:
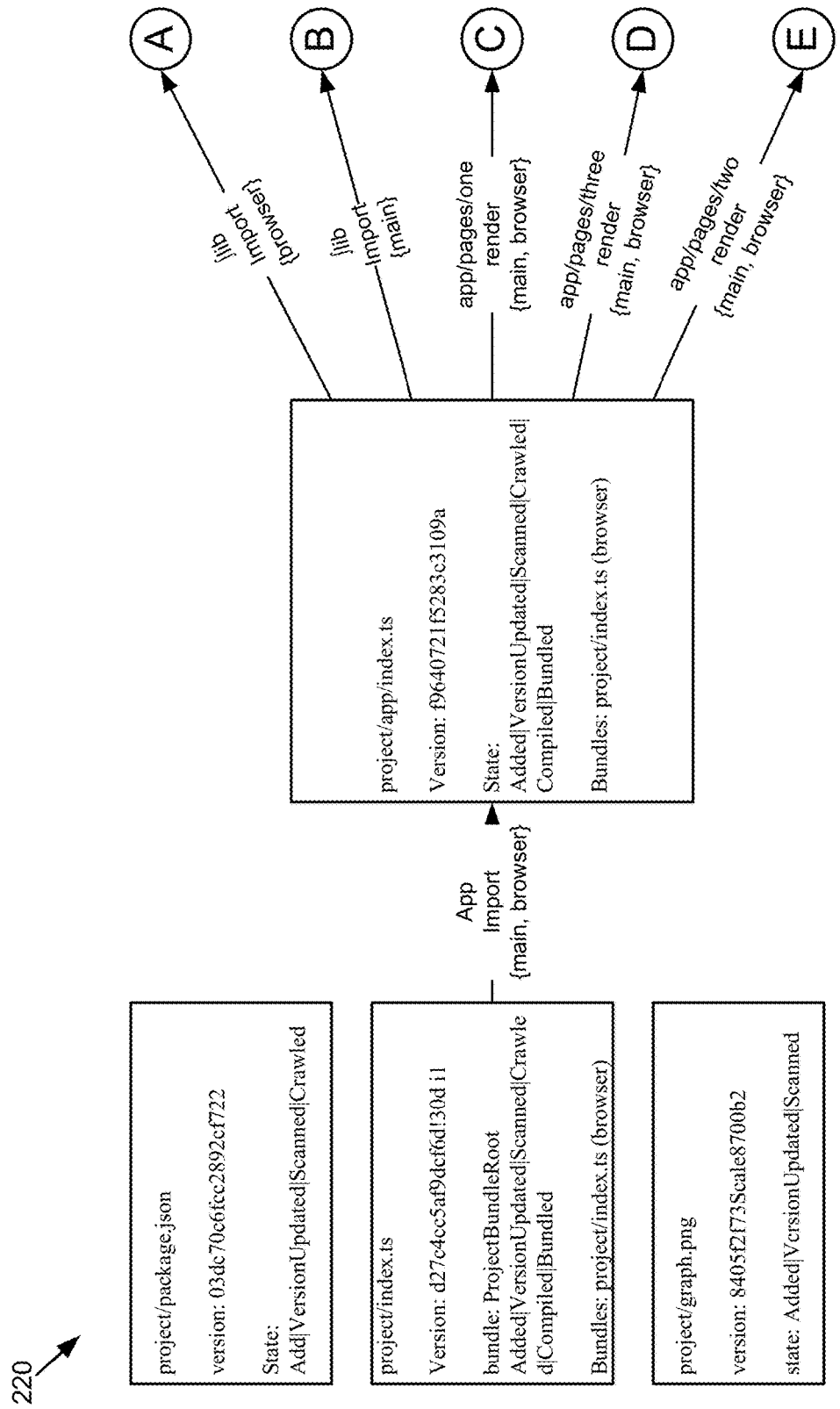
Figure 4B:
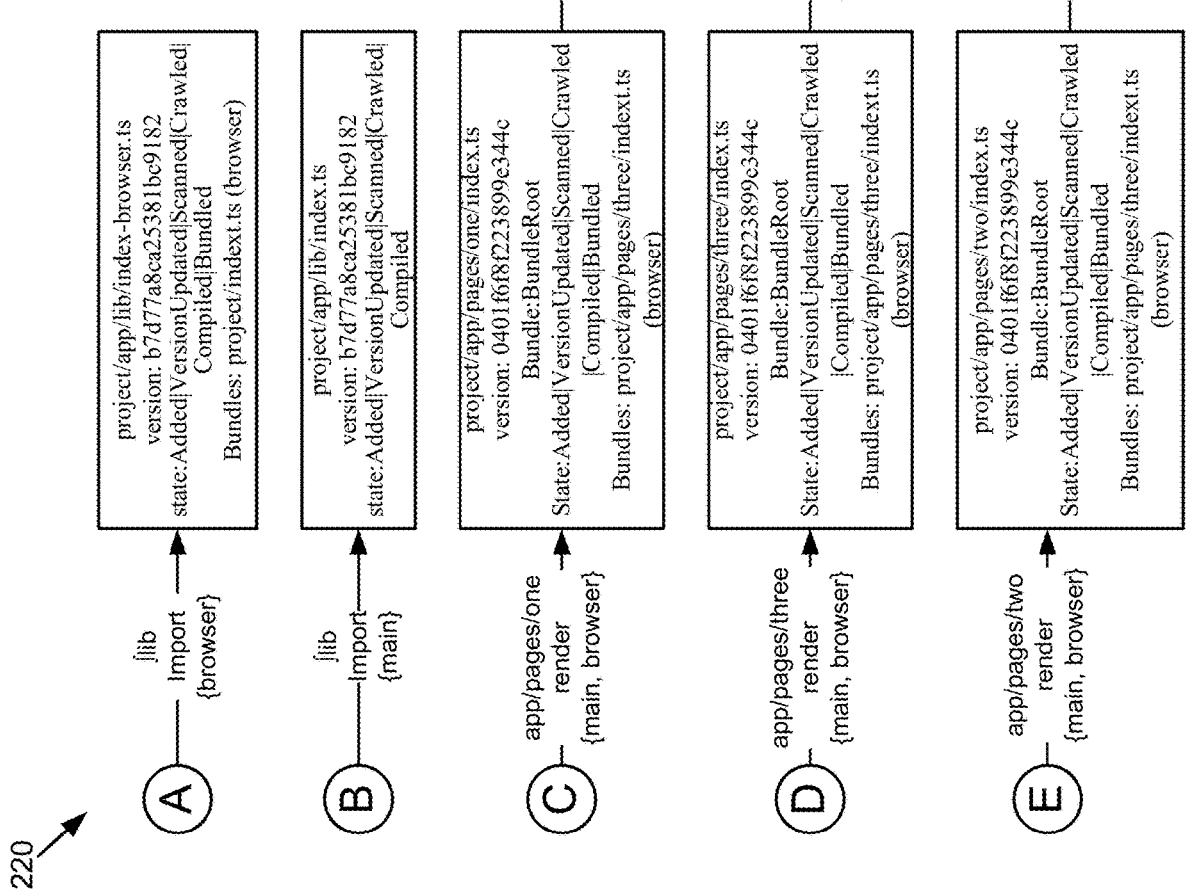

Source Graph 220. The source graph 220 is a data structure generated by the build tool 204 and used by other components to determine what source files 202 are to be used to generate a build for a particular target and what files need to be generated for that particular target. The source graph 220 also includes locations of the particular files needed to generate the build as well as the files that should be distributed as part of the build. The source graph 220 also references the state of the files, their associated version, and other information so that the build tool is able to generate a build specific to each particular target. The source graph 220 advantageously has multiple edges for maintaining multiple target dependencies and import redirects. One example source graph 220 is shown in FIGS. 4A and 4B.

In some implementations, upon receiving a source project, the build tool 204 is configured to generate a source graph file including information representing a source graph 220 of the source project. For example, the build tool 204 may generate the source graph 220, whose representation is stored in the source graph file. In some implementations, the build tool 204 can model the dependencies amongst project and package files using a directed cyclic graph data structure as shown in the example in FIGS. 4A and 4B. In some implementations, the vertices of the source graph 220 represent objects such as source files, package files, node.js built ins, native modules of the build system, and/or empty source files. In some implementations, the vertices can also include corresponding virtual paths, as will be further explained below. In some implementations, the directed edges of the source graph 220 represent dependencies amongst the sources for a given import path, build target, and resolution strategy. In some implementations, the build tool 204 can specify dependencies in code within a built file. For example, the build tool 204 may inject code within source code of the built file. The following source code shows examples of code inserted by the build tool 204:

//Creates a dependency to the '@elements/application' package root file.
import {Application} from '@elements/application';
let app=new Application( );
export default app;
// Creates a dependency to the app/views/home/index.ts file.
app.page('/', 'app/views/home');

In some implementations, the build tool 204 can parse stylesheets to determine dependencies to one or more other stylesheets and/or to one or more raw files like images. For example, the following source code shows examples of dependencies specified within a stylesheet that are parsed and used to generate source graph edges between the stylesheet vertex and two children source files (i.e., colors.scss and banner.png):

//Creates a dependency to the app/shared/style/colors.scss file.
@import 'app/shared/style/colors';
.home {
//Creates a dependency to the app/shared/images/banner .png file.
background: url ('app/shared/images/banner .png');

In some implementations, an import path needs to be resolved to a full path on disk. The same import path might result in multiple edges in the source graph 220 generated by the build tool 204 one for each build target, if the import path resolves to a different file for each build target.

Therefore, in some implementations, the build tool 204 can configure the edges in the source graph 220 to include the import path (e.g. './index'), the build targets 110 (e.g. 'main', 'browser'), and the resolution strategy used to resolve the import path to a full path on disk.

In some implementations, the resolution strategies can include a first strategy, e.g., "normal", and a second strategy, e.g., "ts". The "normal" resolution strategy may be the same as that in Node.js while the "ts" strategy may be the same as that in TypeScript, and can allow resolving import paths to declaration files (e ".d.ts" files).

Virtual Path. As described above, a vertex within the source graph 220 can include a virtual path corresponding to the file object represented by that vertex. In some implementations, a virtual path can be a unique path in the domain of an application for a project, package, node.js, or native source. In some implementations, the virtual path can allow a package file location that exists in multiple locations to be mapped into a single canonical path representing that file. In some implementations, the virtual path may be needed in an environment (e.g., Node.js) where the same package version can exist in multiple locations (e.g., in the node_modules folder). The following text shows a few example virtual paths:

projectlapp/index.ts
packages/@elements/application/1.0.0/main/index.js
packages/some-package/1.0.0/mainiindex.js
packages/some-package/2.0.0/mainlindex.j s
native/fs
nodejs/fs
empty/

The bundle graph 222 is similarly a data structure generated by the build tool 204 and used by other components of the build tool 204. In some implementations, the build tool 204 can be configured to generate one or more bundle graphs 222 based on the generated source graph file to allow for more efficient management and use of the target builds. In some implementations, the build tool 204 can be configured to generate one or more bundle files 224 to store representations of the one or more corresponding bundle graphs 222.

In some implementations, a bundle is defined as a set of code, style and raw asset files that are needed to load a page in the web browser or other client. In some implementations, graph vertices of the bundle graph are a subset of the source graph vertices. In some implementations, a source graph vertex will be an entry point for a bundle, and only the entry point source is in the bundle graph. In some implementations, the build tool 204 can generate bundles that depend on older bundles which is modeled with an edge from the entry point of one bundle to the entry point for another bundle, with all of the intermediate source vertices removed.

In some implementations, the bundle graph generated by the build tool 204 can be used for linking source code into bundles suitable for loading a page in the browser, or some other client. For example, for the following source graph:

a.ts→b.ts→c.ts→d.scss→e.png

If the vertex "a.ts" is a bundle entry source, the bundle graph will contain only one vertex: a.ts. The descendant vertices from the source graph will be included in the a.ts bundle. If one of the source files in that bundle has a dependency on another bundle entry point, the build tool 204 generates that bundle to be connected to "a.ts"'s bundle graph vertex via an edge in the bundle graph. For example, if the "c.ts" vertex was also a bundle entry point, then the build tool 204 can be configured to generate a bundle graph as follows:

a.ts→c.ts

In some implementations, the generated bundle graph 222 can allow code to be linked to single executable files that can be sent over http to the browser, or another client. In some implementations, the generated bundle graph 222 can also support incremental relinking: Relinking only the minimum number of files when a code, style, or asset source file changes.

Bundle Map 226. In some implementations, the build tool 204 can be configured to generate a bundle map 226 (e.g., ".elements/dist/browser/bundles.js") based on the one or more generated bundle graphs 222. In some implementations, the bundle map 226 is a file that lists a plurality of bundles in the application with corresponding code, style, and raw asset files needed for that bundle. In some implementations, the bundle map 226 enables needed resources to be determined for loading a particular page, allowing splitting of an application into pages instead of having a single very large code file. The following source code shows an example bundle map:

```
(function( ) {
var Bundle Map={
"project/app/views/home/index.ts":{
    "code": [
        "/assets/app/index.js?version=4jgdulfc8s.js"
    ],
    "style":[
        "/assets/app/index.css?version=9jgdulfc8s.css"
    ],
    "raw": [
        "/assets/app/shared/images/
            banner.png?version=9jgdulfc8s.png"
    ]
}
}
if (typeof window!=='undefined') {
window.BundleMap=BundleMap;
}
if (typeof global !=='undefined') {
window.BundleMap=BundleMap;)
}
)( );
```

Route Based Dependencies. In some implementations, existing build tools cannot split an application's bundles by routes defined in application code. A route maps a URL to a function that is called when a user navigates to the URL in a browser or some other client device. Usually the function will fetch some data from a database and render a page that gets displayed in a browser. In order to load the page, the browser needs to load certain code, e.g., JavaScript. and style sheets associated with that page. Since existing build tools cannot split the bundles by page, however, the browser has to download a single file that contains all of the code for the entire application. This is typically called a "single page app." In contrast, the build tool 204 enables downloading only what is required for a specific page.

In some implementations, in contrast to such prior art application builds, the disclosed the build tool 204 can be configured to determine and retrieve only code which is necessary to load the particular page. The following source code shows example routes created by the user. Each of these pages will become its own bundle in the build tool 204.

// creates a route for '/' that renders the app/pages/home page app.page ('/', 'app/pages/home');
// creates a route for '/signup' that renders the app/pages/ signup page app.page ('/signup', 'app/pages/signup');

In some implementations, the build tool 204 can determine and retrieve the needed code by parsing the generated routes and automatically creating separate bundles for each page. For example, the build tool 204 automatically splits bundles by a render method call. In an application, the developer will usually specify some URL routes that map to a function that then renders a view. It might look something like this:

"""
app.page('/hello', (req)=>{
req.render('app/pages/hello');
});
"""

The above code instructs the computing device that when the user navigates to the URL "/hello" render the view located at app/pages/hello on disk. That code file will contain the code to produce the HTML for that particular page. It used to be that those files would just be static HTML files. But nowadays they are JavaScript files that contain actual code that executes in order to produce the page, and that may also import/require other child code files. Existing build tools have no way of automatically figuring out which code goes with which page. So what they do is just produce one big giant bundle.js file that has everything in it, and deliver that to every page. Well, if you have a giant application that has hundreds or thousands of pages, you now have a giant bundle.js file and that initial download for users is going to be super slow. The build tool 204 of the present disclosure solves this problem by parsing the render( ) calls (like the code snippet above) and automatically identifies the specific pages for the render call. Then for each specific page, the build tool 204 generates a bundle for that page, which makes the bundles as small as possible.

The file scanner 230 may be steps, processes, functionalities or a device including routines for scanning the source files 202 and generating a source graph 220 representing file dependencies within the source files 202. In some implementations, the source files 202 are stored in a source project folder, and the file scanner 230 scans the source project folder to generate the source graph 220 representing file dependencies within the source folder. In some implementations, the file scanner 230 reads all files from the project's directory (i.e. the source tree) using a parallel shared queue for maximum speed. The file scanner 230 also parses each file for dependencies. A dependency is created from one code file to another when the developer writes an import {x} from 'y' statement at the top of the source file. More specifically, a custom hyper fast LL(1) parser, a top-down parser that uses a one-token lookahead, parses import dependencies across all types of source files (javascript, css, scss, typescript). This dependency parser is extremely fast and advantageous for the following reasons. First, the parser only parses the import statement grammar and ignores everything else in the document. In contrast, existing build tools parse the code file into a full code abstract syntax tree (AST) (using third party AST libraries) and then read the dependencies from that. This is fine for project files, since you have to parse the file into an AST anyway in order to compile it. But the problem is the existing build tools also parse ALL package code files into ASTs too. A project can have thousands of packages, each consisting of many files. In some implementations, the LL(1) parser of the present disclosure only parses a grammar for the import/export/require statements explicitly. Second, the parser is built in the Go language which is faster than JavaScript. Third, files in the source tree are processed in parallel (across multiple threads) using a shared synchronized queue.

Each dependency of a source is crawled and a source graph 220 is built in memory that represents the dependency relationships amongst the source files in the project across multiple build targets. The sourced graph 220 tracks the last modified time of each source file, as well as a sha512 digest of the source's file contents and its dependencies. This allows the file scanner 230 and other components of the build tool 204 to know whether a source file has changed on disk since the last time it was read, enabling incremental builds where only changed source files are rebuilt from one build to the next.

A vertex in the source graph 220 represents a source file on disk or a virtual source file (e.g. a native library, an empty source file) and an edge between sources represents the import path and build target from one source to another. Notably, a source vertex may have different edges for different build targets for the same import path. For example, the import import {db} from 'database' might resolve to files/database/index.js for the server build target, and for the browser target the import resolves to the empty virtual source indicating the built file should be blank (i.e. 'empty').

Figure 12:
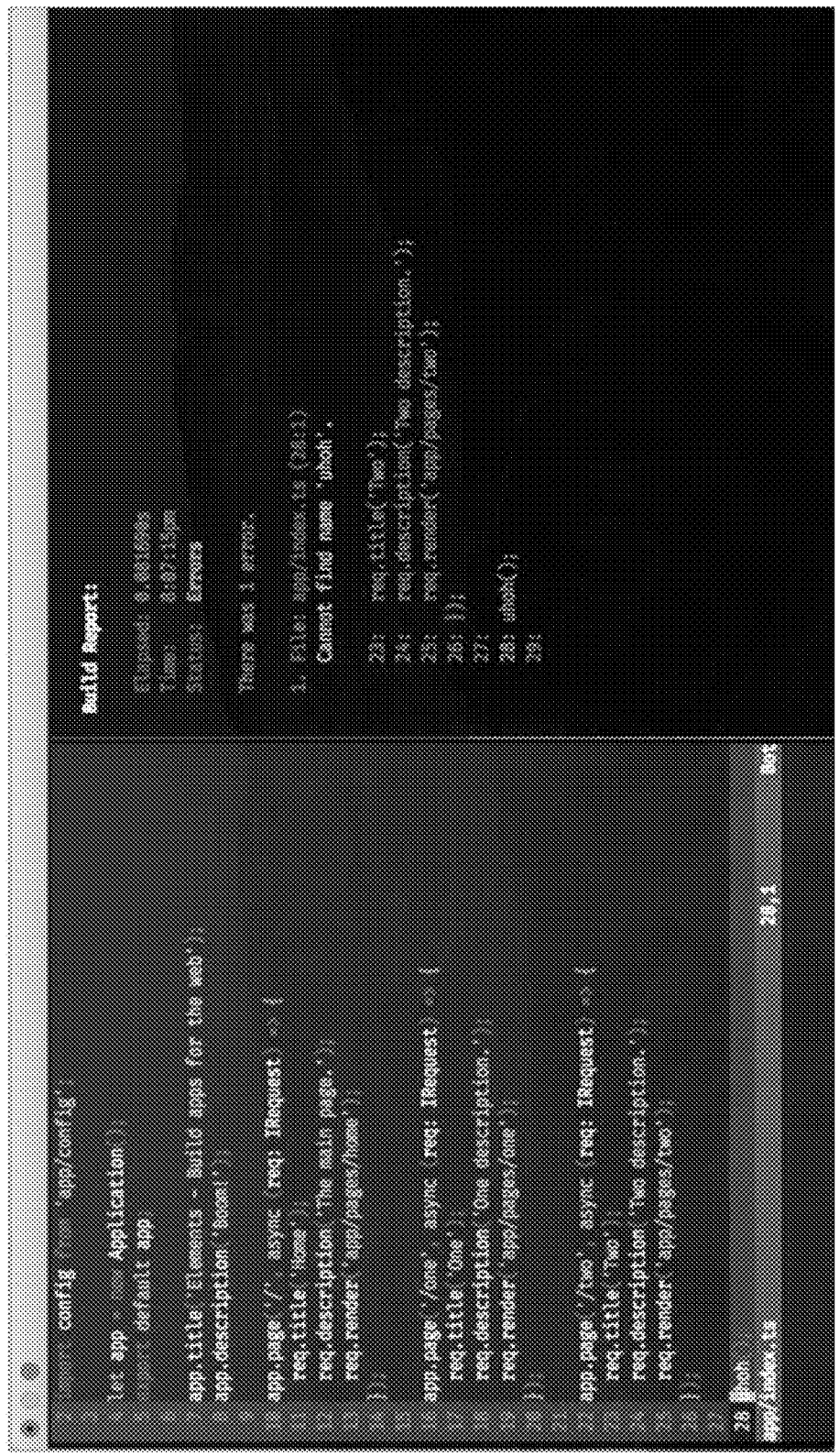
FIG. 12 is a graphic representation of an example user interface for compiling errors in accordance with the present disclosure.

The multiple compiler framework 232 may be steps, processes, functionalities or a device including routines for compiling each software file into compiled files for multiple respective build targets 110. The multiple compiler framework 232 compiles each code and style source file, producing a compiled output file along with a source map that maps the output file contents to the original source file contents for debugging. If there are any errors in the code or stylesheets, those errors are presented to the user as a graphical list in the terminal. One example user interface 1200 displaying compiling errors in accordance with the present disclosure is illustrated in FIG. 12. The user interface 1200 to show compiler errors advantageously displays or presents the highlighted location of the error(s) in source code to show the full context of the error as illustrated in FIG. 12. Once the errors are fixed and the files saved, the files are recompiled automatically when building in watch mode.

In some implementations, the multiple compiler framework 232 compiles uses a pluggable compiler framework that allows running compilers as separate processes, and mapping each source file extension (e.g. ".ts", ".scss") to the correct compiler. In other words, the pluggable compiler framework allows for plugging in external compilers to run as separate processes. In some implementations, an inter-process communication protocol over UNIX domain sockets, named pipes or TCP is used for communication between the build tool 204, in particular the multiple compiler framework 232, and external compiler processes. The multiple compiler framework 232 may include any number of compilers greater than 2. Running the compilers as separate processes allows plugging in any compiler, written in any language, and allows the compilers to run in parallel. In one example, the multiple compiler framework 232 includes TypeScript and Sass compilers. The typescript/scss compilers are open source software that runs on top of the node.js runtime. The build tool 204 has wrappers for these two packages that make them work as processes that communicate with the build tool 204. Typically, prior art projects manage all of these various parts separately (e.g., style files are compiled as a separate workflow from code files). In contrast, the build tool 204 allows combining the compiling and linking for all files in a project, including declaring dependencies between a code file and a style file (which automatically tells the build tool 204 to link the stylesheet and associated assets into the bundle for that code file's page). In another implementation, the TypeScript compiler is executed inside of a V8 JavaScript runtime that may be embedded in the build tool 204. In some implementations, the multiple compiler framework 232 can enhance the compilers by compiling source files to multiple targets, and enabling custom compile transforms to change the source code for different target environments by modified the source code's abstract syntax tree (AST) during the build. For example, a build transform might remove certain portions of code for the browser target. In some implementations, the multiple compiler framework 232 also allows the user to create custom compiler errors to enhance capability of its one or more integrated compilers.

For example, the following source code shows a custom build step defined in a build file (e.g., "config/build.js" file):

export default {
steps: [
function r emoveSqlForBrowserTarget(context)
return function(ast) {
va-541190
if (context.getTarget( )**'browser'){
//

Source files must be compiled in a topological ordering. This means that parents must be compiled before their children in the dependency graph. Also, if a child in the dependency graph changes, all of its ancestors must be recompiled and re-versioned as well.

The multiple compiler framework 232 allows plugging in custom code transforms for TypeScript and JavaScript code. A build transform allows the developer to transform the source code's abstract syntax tree (AST) in order to change the compiled file content, for each build target. For example, a build transform might convert all function bodies to remote procedure calls (rpc) for the browser target. Users can also use transforms to create custom compiler errors. For example, a user may write a transform to type check SQL statements and add a compiler error if the SQL statement doesn't parse correctly, or one of its columns does not exist in the database. The multiple compiler framework 232 includes a few transforms that provide special advantages. The first transform rewrites URL file paths to the full URL with version. If you have a stylesheet that contains the following style rule with a URL to a file path:

.home-rule {
background: uri('./app/images/bg.png');
}

Note the ./app/images/bg.png file path. The compiler will automatically transform to this:

.home-rule {
background: url('/assets/browser/app/images/bg.png?version=<digest>');
}

This transform is important because it allows developers to serve assets like the bg.png file over content delivery networks like Amazon CloudFront, thereby dramatically improving download times for their end users. The second important transform automatically converts render paths to a canonical key that can be used to find the bundle for that page and render the page automatically all in the browser, without going back to the server. Here is an example render method call that says, "I want to render the home page for the /url".

app.page("/", function( ) {
this.render('app/pages/home');
});

For the browser target, this code will be transformed to:

app.page("/", function( ){
this.render('project://app/pages/home/index.tsx');
});

By converting the path to a "canonical key" the runtime code in the browser can lookup the bundle for this page and automatically load the correct assets for this page from the bundle.js file as will be described below.

The linker & bundler 234 may be steps, processes, functionalities or a device including routines for linking code and stylesheets into combined asset files. In some implementations, the build tool 204 includes the linker & bundler 234 that links together code, style and raw assets (e.g. images) into a bundle for each bundle entry point (e.g., a page in the application). In some implementations, the linker & bundler 234 can be configured to automatically perform a topological sort of the source graph 220 vertices to ensure that children dependencies are written before the parents that depend on them. For example, if a style sheet imports "colors.scss", the color variables may need be written before the stylesheet rules that use those colors.

The browser target, as well as any other custom targets defined by the user, is linked and bundled by the linker & bundler 234. Linking is the process of combining multiple source files into one source file in a format that is executable on the browser (in contrast to the server which has a different mechanism for requiring and executing dependencies). For example, the server environment may be the Node.js runtime. This is a program (kind of like the Java JVM) that runs JavaScript programs. When we "target" the server in the build, the TypeScript compiler converts "import" statements into a function call for the Node.js process, which Node.js uses to import the file. The build tool 204 does not need to "link" the file into a single file with other code files since on the server, the node process will simply require each file separately from disk.

For example, let's say we start with this source file:
app.ts
import {one} from './one';
import {two} from './two';

For the server (node.js) target that file will get compiled to something like:
app.js
var {one}=require('./one');
var {two}=require('./two');

The "require( . . . )" function resolves the path to a full path on disk, reads the file and evaluates it dynamically that is part of the node.js process.

In contrast, that won't work in the browser because the browser doesn't have a disk to look for files. The browser must go over the network. So, the linker & bundler 234 advantageously links together all of those dependencies into a single file, and provides runtime code that allows those require statements to work in the browser, all while minimizing the number of requests that have to be made to the server for each individual file to minimized network latency.

Bundling is the process of figuring out all of the code, style and raw asset (e.g. images) files required to load a particular page in the application. Bundles will contain at least one linked code file and possibly one or more linked stylesheets, and raw assets. A bundle is defined by a root in the source graph 202. The linker & bundler 234 must start at this root and traverse the graph in a topological order (i.e., child dependencies come before parent dependencies), automatically linking and adding code, style and asset sources to the bundle, and writing them to disk. Bundles can be combined such that one bundle also uses the contents of another bundle. All external packages are automatically created as bundles.

The linker & bundler 234 advantageously automatically creates bundles based on pages in the app by inspecting the source code to find all the places where render('app/pages/home') calls are made. In contrast, existing build tools will create only a single bundle for the entire app. But a single bundle can become quite large as an application grows. For example, a medium size application might have a 10 MB bundle that includes all the pages for the app. This makes the download of the app for a user very slow, and it might not even work at all on a slow connection. The linker & bundler 234 of the present disclosure advantageously solves this problem by "splitting" the application into multiple bundles, one for each page in the application.

The runtime file loader 236 may be steps, processes, functionalities or a device including routines for preparing a distributed application for running as a web server application program. In some implementations, the runtime file loader 236 is configured to generate a loader file (e.g., ".elements/dist/assets/loader.js") that contains code that works with the bundle.js map to dynamically load code (e.g., javascript code) and stylesheets for a given page, without having to reload the page by making a full trip to the server for a new HTML page. Specifically, in one example, runtime file loader 236 generates three runtime files: (1) bundle.js (for browser bundled targets) (2) loader.js (for browser bundled targets) (3) dist.json (one of these for the entire build). In some implementations, to provide such a functionality, the loader file, when run, can read the bundle map and patch a header (e.g., "<head>") section of the HTML document, removing old code and style references, and adding the ones required to load a particular page. The asset server (e.g., the host server 110a) utilizes http caching headers to ensure the client only receives files that have changed since the last time the client requested the file. This makes downloading assets in clients like the browser significantly faster for end users. Web applications that are built with the build tool 204 may be the fastest web applications on the Internet.

The runtime file loader 236 automatically creates the loader.js runtime file for any bundled targets (e.g. the browser target). This runtime code allows the linked code assets to execute in the browser, and allows a page to be constructed dynamically in JavaScript. The runtime file loader 236 can load a page by consulting the bundle.js file and patching the <head> section of the html with any script and stylesheet files. The runtime file loader 236 maintains each module in a linked list that allows any source to require/import any other linked file loaded for a page. The runtime file loader 236 also advantageously automatically uses a unique bundle.js runtime file. The bundle.js runtime file contains a map of all bundles keyed by a bundle key for a given target. The bundle will have URLs for all code, stylesheet and raw assets required for a given bundle. The browser runtime code can prefetch all resources for an app, making the execution of the application much faster to the user. An example bundle.js runtime file is shown below:

```
{
    "project://app/pages/home/index.tsx": {
        "version": "<digest of bundle>",
        "size": 1024,
        "code":    ["/assets/browser/app/pages/home/index.js?version=abc"],
        "style":   ["/assets/browser/app/pages/home/index.css?version=def"],
        "assets":  ["/assets/browser/app/images/bg.png?version=ghi"]
    }
}
```

The runtime file loader 236 also automatically produces a distribution manifest file 304 (e.g., "dist.json file"). The distribution manifest file 304 includes all built files, their version hashes, bundles and file URLs for bundled targets (e.g., the browser). It can be used by a server application to serve the app, or by the hot reload module 248 (described below) to automatically reload any changed files on the server. Selected portions of an example distribution manifest file 304 presented in a user interface generated by the build tool 204 in accordance with the present disclosure is shown in FIGS. 13A-13D.

The parallelized crawler 240 may be steps, processes, functionalities or a device including routines for crawling the source files in a source project folder. In some implementations, the source graph 220 generated by the file scanner 230 for a large project may contain tens of thousands of vertices. To provide a useful tool, the build tool 204 may need to be able to crawl the source files of a source project and produce a source graph 220 very quickly, for example, usually in less than a one second. The parallelized crawler 240 is able to crawl the source files in parallel for each target using a shared queue. In some implementations, to achieve this functionality, the build tool 204 includes a parallelized crawler 240 that can be configured to implement a crawler that uses a multi-threaded graph search algorithm. In some implementations, the parallelized crawler 240 uses a synchronized queue for vertices that need to be processed. By providing the synchronized queue, the multiple threads supporting multiple crawler workers can work off of this queue to build the source graph 220 as quickly as possible in parallel.

The cache versioning unit 244 may be steps, processes, functionalities or a device including routines for automatically creating versions and using them for caching. In some implementations, the cache versioning unit 244 can link code, style, and assets into files that are suitable for http caching over the web using a fingerprinting hash algorithm. In one implementation, a sha-512 hashing algorithm is used. This functionally may enable only the needed code to be retrieved for a loaded web page, which has significant performance (i.e., load/reload speed) advantages over traditional "single page" applications that may need to download the code for the entire application to service a single page. The cache versioning unit 244 is particularly advantageous because of how the versions are calculated. The cache versioning unit 244 calculates the versions such that a source file's version is a function of its own file content+the file content of all of its dependencies, all the way down the dependency tree, in a topological ordering of the dependencies, thereby making versions deterministic—i.e., they will always be a function of the source file's content, and also the content of all of the dependencies, ordered the same way each time. In some implementations, the version can be used in the URL and in caching systems such that if the file changes, its URL changes, providing a simple http cache invalidation mechanism. By providing the version string in the source graph 220, a server can set the expiry for a URL to be 6 months, a year, or infinite, and the software build generated by the build tool 204 allows the browser to retrieve most of the assets from its cache, dramatically speeding up loading time.

The file watching unit 246 may be steps, processes, functionalities or a device including routines for automatically watches or monitoring files for changes. If changes to files are detected, the file watching unit 246 can signal the hot reload module 248 (described below) to reload a user's application while the user is working on it. This means the user will see their app change in real time as they save files, and will be presented with any error or success messages as they work. This dramatically increases productivity by giving the developer real-time feedback as they work, and allowing them to see the results of their work immediately. The file watching unit 246 reduces CPU usage dramatically on the user's machine. In some implementations, the file watching unit 246 uses system calls (syscalls) to listen for file change events, and then uses a delayed directory diffing algorithm to figure out what files have changed on disk, delivering these change events to the build tool very quickly. More specifically, the file watching unit 246 monitors for file and directory events from the operating system. In one implementation, the file watching unit 246 uses a delayed scheduled task to wait until the events quiet down, and then scans the changed directories to see what has changed since the last diff. The diff is possible because a mirror of the file tree is stored in memory (in the file watcher code). And that tree is compared/diffed against folders that have changed on disk, in linear time, producing a stream of events to the build tool 204 to indicate which files have changed. The file watching unit 246 then signals the multiple compiler framework 232 to recompile those files as needed. In other words, the diff algorithm traverses the in-memory tree and the on-disk tree and compares them to see what's changed, feeding those changes to the multiple compiler framework 232.

The hot reload module 248 may be steps, processes, functionalities or a device including routines for automatically rebuilding only those files that have changed (and their ancestors), and reloading a running program to itself without restarting the process. The file watching unit 246 can watch a project for file changes as described above then a change is detected, it signals the hot reload module 248 which in turn automatically rebuild only those files that have changed (and their ancestors). Hot reloading allows a running program to reload itself without restarting the process. The running program can look at the distribution manifest file 304 to determine which files have changed on disk, and "hot" reload them in memory without shutting down the process, resulting in very fast reloads after compiling has completed.

Since the build tool is configured to topologically order the build dependencies within the source graph 220 enable parents to be built after children in the directed source graph 220, and the dependencies are encoded in the versioning, the hot reload module 248 is able to identify specific code that has changed vs the entire code tree (or graph) and hot loaded. By providing such functionality, the build tool 204 is able to provide real-time "hot-reload" building during software development (e.g., upon determining that a file in a source project has changed, the build system can rebuild the source project in less than 1 second versus rebuilding the entire source project).

The code files can be considered as a tree loaded into memory, where the tree represents the dependencies amongst the files. For example, one branch of this tree might look like a.js→b.js→c.js and in a.js you see code like "require('./b.js')" and in b.js you see code like "require('./c.js')". When a code file is required using the require( . . . ) function call as illustrated above, in the Node.js runtime, it is read from disk and then evaluated (i.e., executed). Whatever is exported from the file with the code 'module.exports.someThing="someValue"' is stored in a cache in memory. So, if the same file is required again, by the same or a different parent, the cached copy of the exports is returned. So, when those source files have changed, the running process is notified to delete the cache of those files, and re-require the tree from the top of a changed branch. This is basically re-requiring the root of a tree, and it will then be evaluated again, re-requiring all of the changed children that haven't been deleted from cache.

This doesn't mean that values stored on the heap are also destroyed. For example, if some code still had a reference to an old value, and was holding onto that reference, the value would continue to be stored in the heap. But any new code like functions, classes, etc. that were exported by the new code file would be what gets used in any future calls. In practice, most of the heap gets cleared out of old code files in the hot reload because application modules are mostly exporting functions, classes, and variable values. Hot module reloading on the server is critical to a fast developer experience where they can see the results of their work in real time in the browser as they update files.

The build controller 250 includes software, hardware, and/or logic to provide the functionality for handling the operations of the build tool 204, the interaction of the components of the build tool 204 as described throughout this document. In some implementations, the build controller 250 can be implemented using hardware such as a microprocessor. In other embodiments, the build controller 250 can be implemented using a combination of hardware and software executable by processor 235. In some implementations, the build controller 250 performs the processes described below with reference to FIGS. 6-12. The build controller 250 also is responsible for sending and receiving data and control signals to and from the other components of the build tool 204 including the source graph 220, the one or more bundle graphs 222, the file scanner 230, the multiple compiler framework 232, the linker & bundler 234, the runtime file loader 236, the parallelized crawler 240, the cache versioning unit 244, the file watching engine 246, and the hot reload module 248. The build controller 250 controls the overall operation of the build tool 204 consistent with the description above of how the components operate and the processes below.

Figure 3:
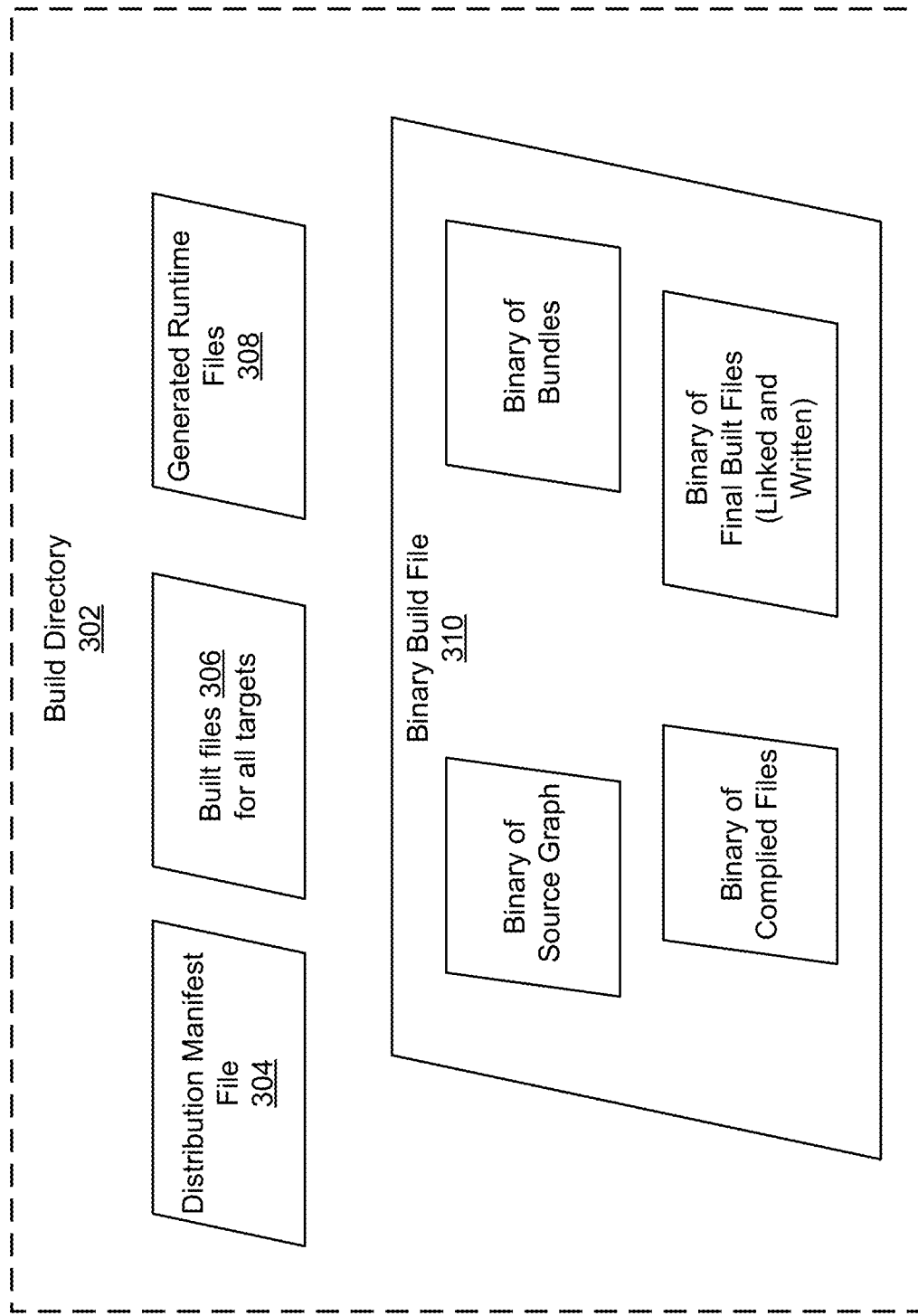
FIG. 3 is a block diagram of one implementation of a build directory in accordance with the present disclosure.

Referring now to FIG. 3, a block diagram of one implementation of a build directory 302 in accordance with the present disclosure is shown. The build directory 302 (sometimes referred to herein as a "build folder" or a "build project") includes all the files needed to efficiently generate the software build for a distributed application across a plurality of build targets 110. In some implementations, the build directory 302 includes a distribution manifest file 304, the built files 306 for all the targets 110, a generated runtime file 308, and a binary build file 310, and other files. In one example, the build tool 204 is configured to generate the source graph 220 as a source graph file (e.g., "graphs.json"), distribution manifest file 304 as a "distj.son" file within the build directory 302, a loader file as "loader.js", and a bundle map 226 as bundle.js".

One example of a template for a build directory 302 is follows:

```
dist/
    dist.json
    main/
        app/
            index.js
            views/
                home/
                    index.js
                    index.css
    browser/
        project/
            app/
                index.js
                index.js.gz
                index.js.map
                index.js.map.gz
                views/
                    home/
                        index.js
                        index.js.gz
                        index.js.map
                        index.js.map.gz
                        index.css
                        index.css.gz
                        index.css.map
                        index.css.map.gz
```

As shown above, the build folder has many more files than the source project folder. This is because for each source file of the source project folder, must be compiled by the build tool 204 for each build target 110. In one example, the build targets 110 include a main build target and a browser build target. When a source file is compiled by the multiple compiler framework 232, the build tool 204 can be configured to modify the source code in the source file based on the given target 110. For example, the build tool 204 for may remove SQL commands from the source code of a source file when compiling the source file to the browser target to avoid sending SQL commands to the insecure browser client. The built files 306 for the all the targets 110 are stored in the build directory 302 as shown in FIG. 3.

In some implementations, the build tool 204 is configured to generate a distribution manifest file 304 (e.g., "dist.json" or ".elements/dist/dist.json" file) to track file changes within a build. In some implementations, to provide a hot reload functionality to software developers, the build tool 204 can be configured to automatically send a signal to a running process when the build tool 204 detects any files change in the distribution manifest file 304 that is produced in the distribution folder. This is useful in real-time development when reloading server code is desired after the software developer makes a change to a source file and the project is recompiled. In some implementations, the hot reload functionality provided by the build tool 204 can also be used in production systems to reload a server process in place without restarting the entire process. This distribution manifest file 304 is also stored in the build directory 302.

The build directory 302 also includes generated runtime files 308. The generated runtime files 308 are in addition to the built files 306, and allow the built files 306 to work in the browser. For example, the generated runtime files 308 for bundled targets are: (1) bundle.js (2) loader.js.

Finally, the build directory 302 includes a binary build file 310. The binary build file 310 stores binary representation of the source graph, a binary representation of the bundles, a binary representation of the compiled files, and binary representation of the final built (linked and written) files as illustrated in FIG. 3.

The build directory 302 may include any other files needed to generate the software build for a distributed application for any of the plurality of build targets 110.

Figure 5:
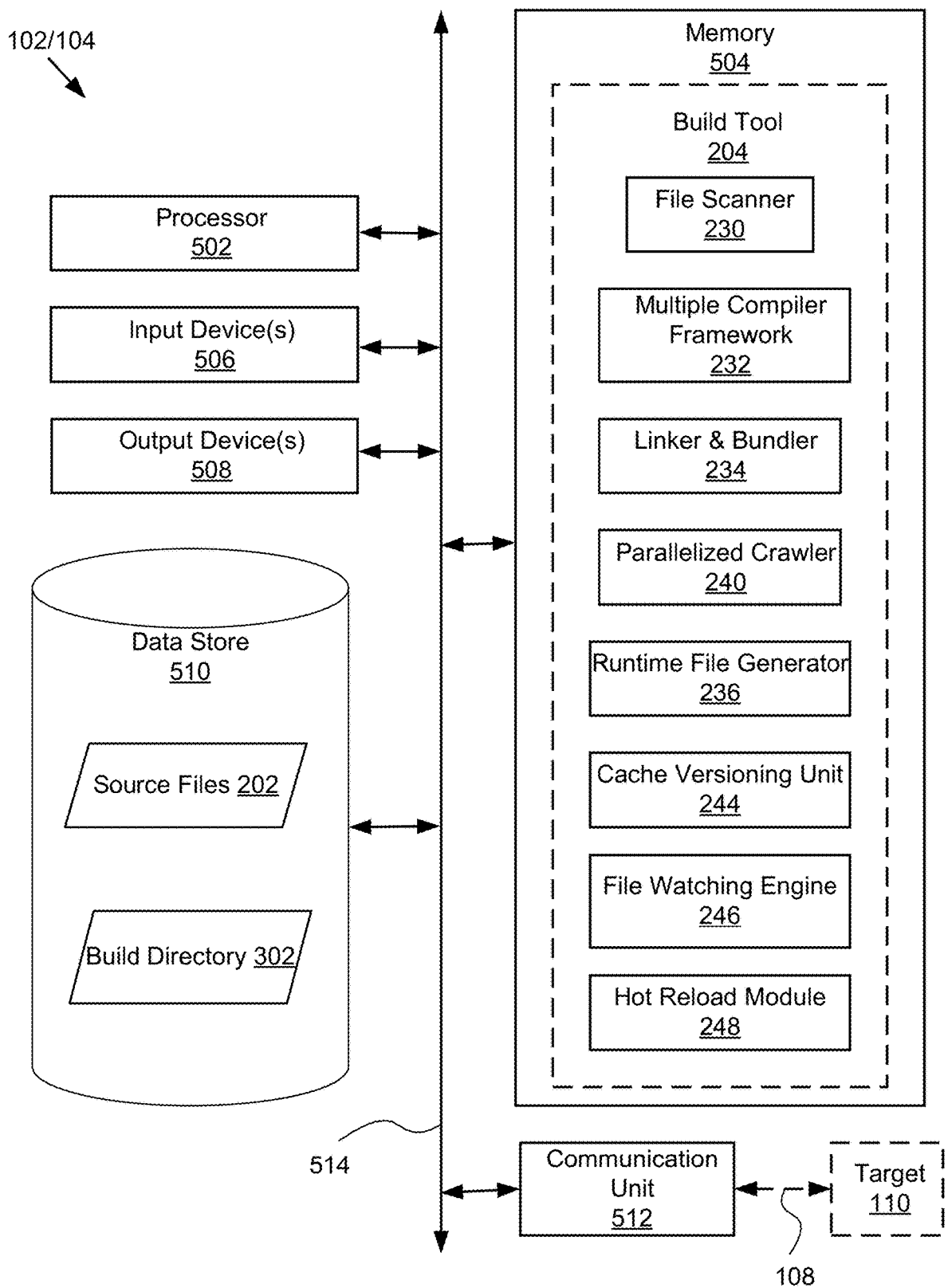
FIG. 5 is a block diagram of one implementation of a computing device or development server in accordance with the present disclosure.

Referring now to FIG. 5, one implementation of a computing device 102 or development server 104 in accordance with the present disclosure will be described in more detail. It should be understood that the build system 106 including the build tool 204 and the source files 202 may be operational on any one of the computing devices 102a-102n or the development server 104 or combinations thereof in different implementations. For all those implementations, FIG. 5 is an illustrative configuration. As depicted, a computing device 102 may include a processor 502, a memory 504, one or more input devices 506, one or more output devices 508, a data store 510, and a communication unit 512. The components depicted in FIG. 5 are provided by way of example and it should be understood that the computing device 102 may take other forms and include additional or fewer components without departing from the scope of the present disclosure. For instance, various components of the computing device 102 may be coupled for communication using a variety of communication protocols and/or technologies including, for instance, communication buses, software communication mechanisms, computer networks, etc. While not illustrated, the computing device 102 may include various operating systems, sensors, additional processors, and other physical configurations. The processor 502, memory 504, etc., are representative of one or more of these components.

The components 504, 506, 508, 510, and/or 512, may be communicatively coupled by a bus 514 and/or the processor 502 to one another and/or other components of the computing device 102. In some implementations, the components 504, 506, 508, 510, and/or 512 may include computer logic (e.g., software logic, hardware logic, etc.) executable by the processor 502 to provide their acts and/or functionality. In any of the foregoing implementations, these components 504, 506, 508, 510, and/or 512 may be adapted for cooperation and communication with the processor 502 and the other components of the build system 106.

The processor 502 comprises an arithmetic logic unit, a microprocessor, a general-purpose controller or some other processor array to perform computations and execute software instructions by performing various input, logical, and/or mathematical operations. The processor 502 may be coupled to the bus 514 for communication with the other components. The processor 502 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 502 may be physical hardware and/or virtual and may include a single core or plurality of processing units and/or cores. In some implementations, the processor 502 may be coupled to the memory 504 to store data therein and access data and instructions stored therein. The processor 502 may also be coupled to other components of the computing device 102 including, for example, the input device 506, the output device 508, the data store 510, and the communication unit 512.

The memory 504 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 502. In some implementations, the memory 504 may include one or more of volatile memory and non-volatile memory (e.g., RAM, ROM, hard disk, optical disk, etc.). For example, the memory 504 may include secure digital (SD) card(s). It should be understood that the memory 504 may be a single device or may include multiple types of devices and configurations. In some implementations, the memory 504 stores the build tool 204 and all of its components as depicted. These components operate with the functionality that has been described above by the processor 502 executing the information stored in the memory 504. The memory 504 may also store many of the data structures and files of the described above, on a temporary basis wanting use or a more permanent basis.

The memory 504 may store and provide data access to the other components of the build system 106. In some implementations, the memory 504 may store instructions and/or data that may be executed by the processor 502. The memory 504 is also capable of storing other instructions and data, including, for example, an operating system, hardware drivers, other software applications, databases, etc.

Although not shown, the memory 504 may include any operating system suitable for operating on the network. The software can be written in any suitable programming language, such as C, C++, Java, or Python. In various implementations, application software embodying the functionality of the present disclosure can be deployed in different configurations, such as in a client/server arrangement or through a Web browser as a Web-based application or Web service, for example.

The one or more input devices 506 may include any device for inputting information into the computing device 102. In some implementations, the input device 506 may include one or more peripheral devices. For example, the input device 506 may include a keyboard, a pointing device, microphone, one or more sensors, an image/video capture device (e.g., camera), a touch-screen display integrated with the output device 508, etc.

The output device 508 may be any device capable of outputting information from the computing device 102. The output device 508 may be any one or more of a monitor or display (LCD, LED, OLED, etc.), a speaker, a printer, a haptic device, an audio reproduction device, a touch-screen display, a remote computing device, etc.

The data store 510 stores video data, audio data, user data, and other types of data received from the processor 502, the memory 504 and the other components of the computing device 102. The data store 510 may store data associated with or include a database. The database(s) may include information sources for storing and providing access to data. In some implementations, database(s) may store data associated with a database management system (DBMS) operable on the computing device 102. For example, the DBMS may include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. As depicted, the data store 510 may store source files 202 as described above with reference to FIG. 2B and the build directory 302 as described above with reference to FIG. 3.

In some implementations, the communication unit 512 may include one or more interface devices (I/F) for wired and wireless connectivity to the other entities and/or components of the system 100 or other entities and/or components external to the system 100 such as third-party servers, networks, or other systems. For instance, the communication unit 512 may include, but is not limited to, various types of known connectivity and interface options. The communication unit 512 can provide connections to other entities of the system 100 using various standard communication protocols. For instance, the communication unit 512 may include, but is not limited to, cable interfaces (e.g., CAT-5), wireless transceivers for sending and receiving signals using Wi-Fi™, Bluetooth®, cellular communications, etc., universal serial bus (USB) interfaces, various combinations thereof, etc. The communication unit 512 may be coupled to a network such as a network 108. In some implementations, the communication unit 512 can link the processor 502 to the network 108 which may in turn be coupled to other processing systems. The communication unit 512 can provide other connections to the network 108 and to other entities and systems using various standard communication protocols, including, for example, those discussed elsewhere herein. In particular, the communication unit 512 allows the computing device 102 to communicate with other computing devices 102, the development server 104 and the targets 110 to achieve the functionality described herein.

Figure 6:
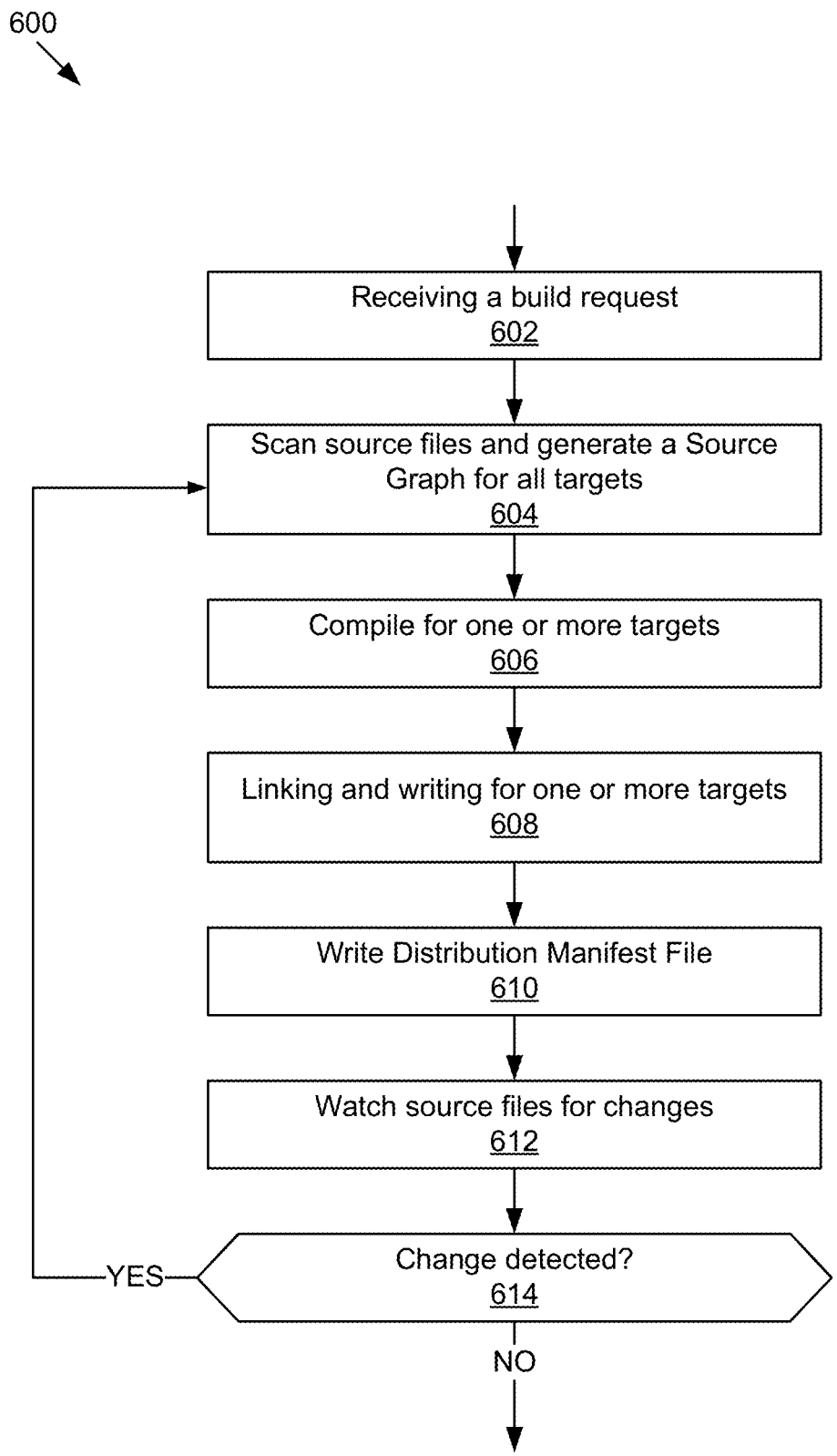
FIG. 6 is a flowchart of an example method for building a software application for one or more targets in accordance with the present disclosure.

Referring now to FIG. 6, a general method 600 for using the build system 106 of the present disclosure to generate source code for a plurality of targets 110 will be described. The method 600 begins by receiving 602 a build request. For example, a developer can use their computing device 102 to send a build request to the build system 106. The request may include a reference to a source folder or the source folder itself comprising a collection of software files to implement a distributed application. Next, the method 600 scans 604 source files and generates a source graph 220 representing file dependencies within the source folder. One example source graph 220 was described above with reference to FIGS. 4A and 4B. This process is described in more detail below with reference to FIG. 7. Next, the method 600 compiles 606 code for one or more respective build targets 110. In some implementations, the method 600 does this automatically in serial for each target 110. This block is described in more detail below with reference to FIG. 8. In other implementations, the method 600 generates the compiled code in parallel for each target 110. Then the method 600 links and writes 608 compiled code for one or more targets 110 using the compiled code from block 606. If the target 110 is bundled, both linking and writing will be performed for the target 110 by storing linked files and/or written files. However, if the target 110 is not bundled, then only writing is performed to store written files. One example of this block 608 is described in more detail below with reference to FIG. 9. Next, the method 600 writes 610 the distribution manifest file 304 to build directory 302. The distribution manifest file 304 includes linked and written files from block 608. In some implementations, the method 600 may also include additional steps of watching 612 source files for changes, and determining 614 whether a change was detected. One example of this block 612 is described in more detail below with reference to FIG. 10. If a change was detected, the method 600 loops to block 604 to repeat steps 604-612 for the changes that were detected. On the other hand, if no change was detected the method 600 is complete. In some implementations, if no change was detected the method 600 can loop back to block 612 to continue to watch or monitor for changes to the source files. Some of these steps are described in more detail with reference to FIGS. 7-11 below.

Figure 7:
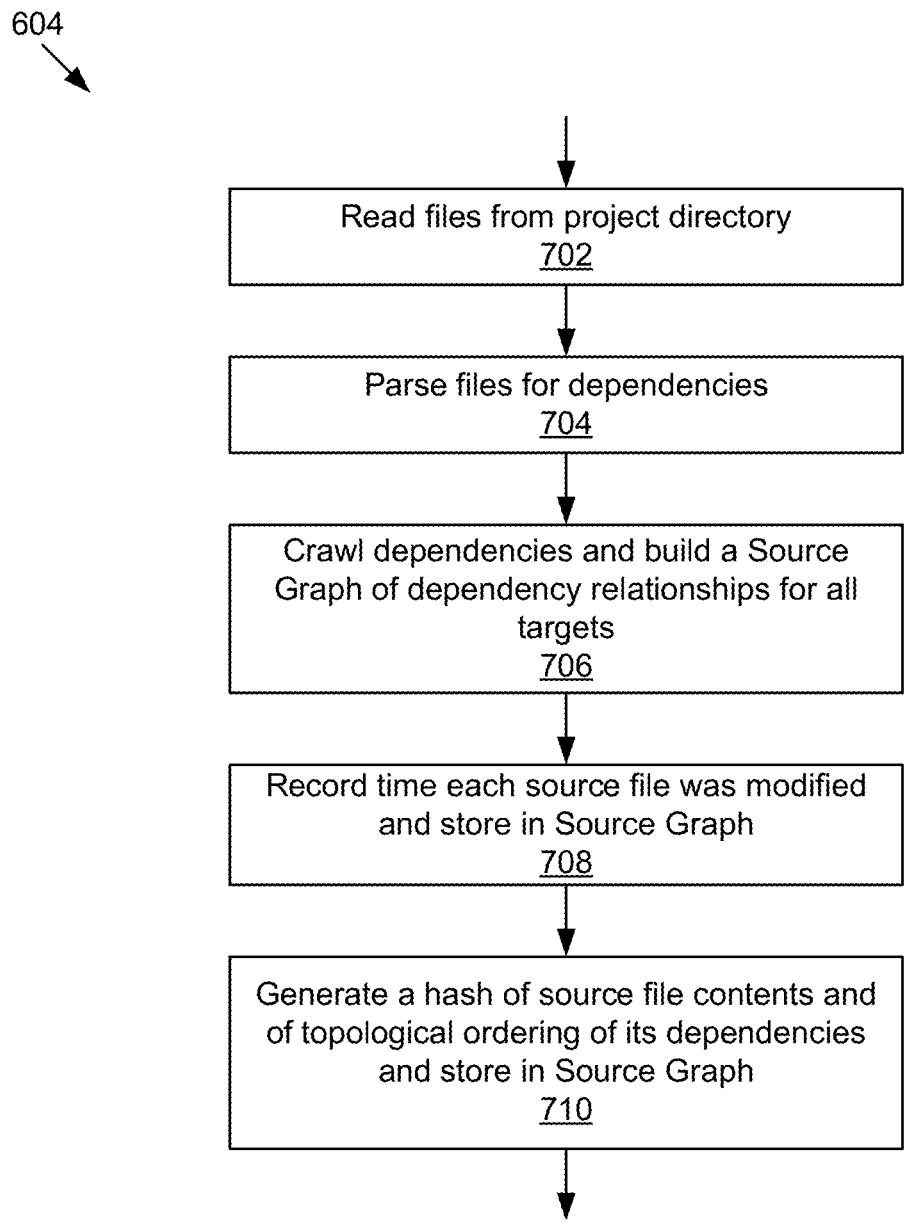
FIG. 7 is a flowchart of an example method for generating a source graph in accordance with the present disclosure.

Referring now to FIG. 7, one implementation of the method 604 for scanning source files and generating a source graph 220 is described in more detail. The method 700 begins by reading 702 files from a project directory. The method 604 then parses 704 files for dependencies. The dependencies are then crawled in block 706 to build a source graph 220 of dependency relationships. The method 604 continues to record 708 the time each source file was modified and store that information in the source graph 220. The method 604 continues in block 710 to generate a hash of the source file contents and stored in the source graph 220.

Figure 8:
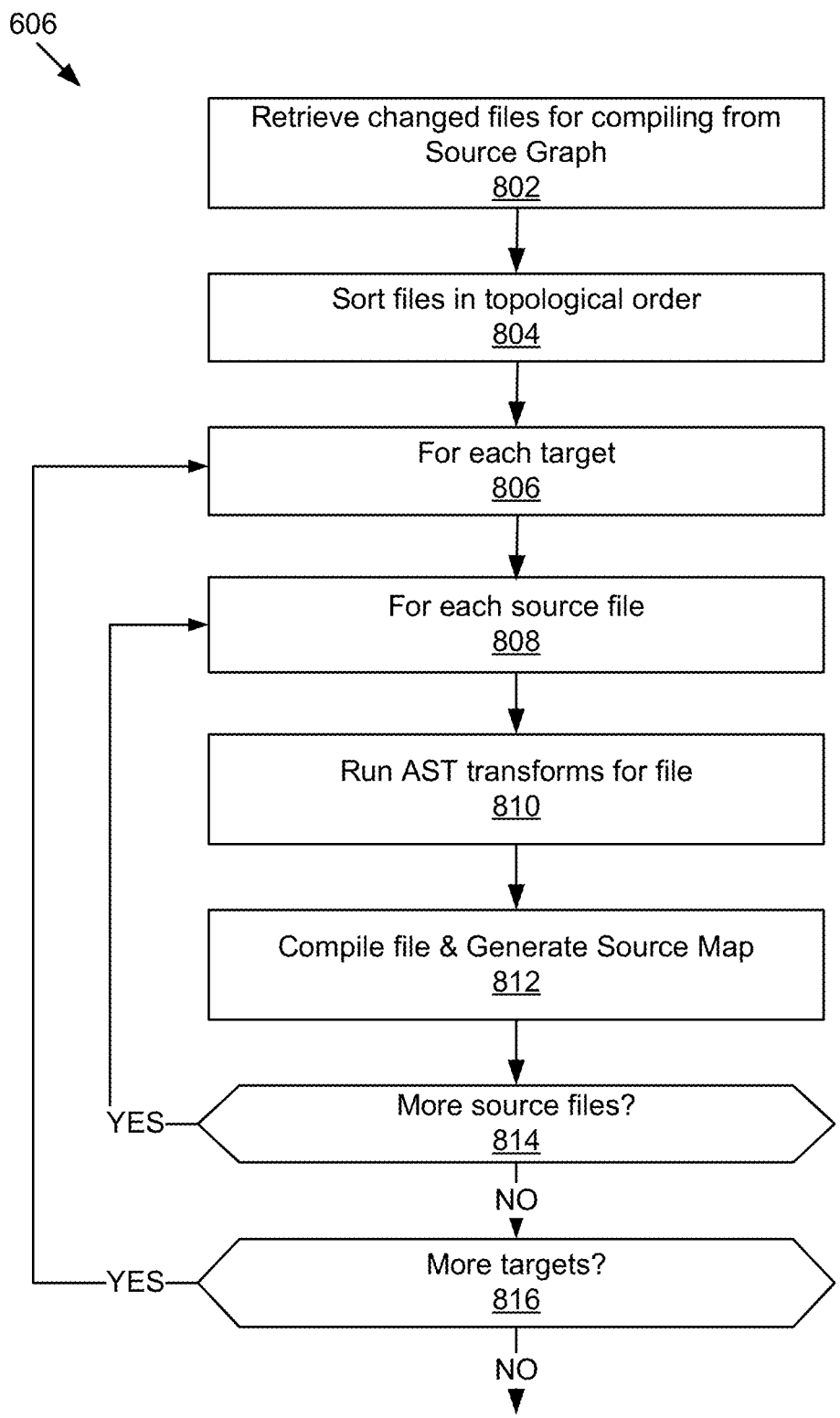
FIG. 8 is a flowchart of an example method for compiling code for multiple targets in accordance with the present disclosure.

Referring now to FIG. 8, one example implementation of a method 606 for compiling code for one or more targets 110 is described. The method 606 begins by retrieving 802 changed files for compiling from the source graph 220. Next in block 804, the method 606 sorts the retrieved files in topological order. In block 806, the build tool 204 begins a compiling loop of process steps including blocks 808, 810, 812 and 814 for each target 110. Next, in block 808, the method 606 begins a loop of process steps including blocks 810 and 812 for each source file for the target 110. In block 810, the method 606 runs abstract syntax tree (AST) transform on the source file. Then in block 812, the method 606 compiles the file and generates a source map. Next, in block 814, the method 606 determines whether there are additional source files for the target 110. If so, the method 606 returns to step 808 and performs steps 810 to 814 for another source file. If not, the method 606 proceeds to block 816. In block 816, the method 606 determines whether there is another target 110 for which code needs to be compiled. If so, the method 606 returns to block 806 and performs steps 808, 810, 812 and 814 for another target 110. If in block 816, the method 606 determines that there is not another target 110 for which code needs to be compiled, the method 606 is complete and continues. In other alternate implementations, it should be noted that the code for the multiple targets 110 may be compiled in parallel. This would involve performing one or more of steps 804, 806, 808, 810, and 812 in parallel with each parallel stream performing the steps for a different target 110 or for a different source file.

Figure 9:
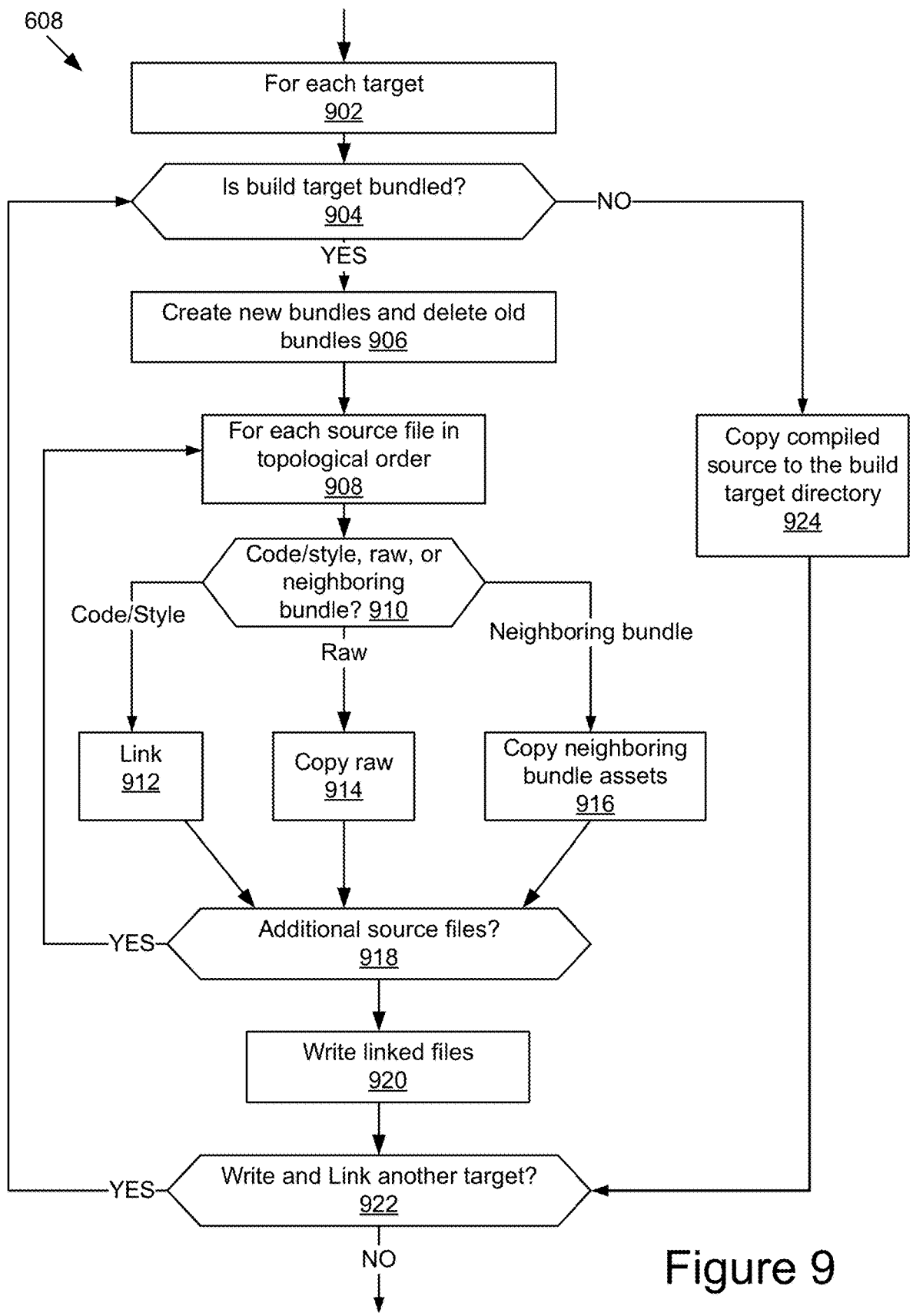
FIG. 9 is a flowchart of an example method for linking and writing in accordance with the present disclosure.

Referring now to FIG. 9, one implementation of the method 608 for linking and writing for one or more targets will be described. In block 902, the method 608 begins a loop of process steps including blocks 904 to 922 for each target 110. Next, the method 608 determines whether the build target 110 is bundled or not. For example, a build target 110 like a browser is bundled whereas a build target 110 like a server is not. If the build target 110 is not bundled, the method 608 proceeds to block 924 and the build tool 204 copies the compiled source code to the build target directory. On the other hand, if it is determined in block 904 that the build target 110 is a bundle build target, the method 608 proceeds to block 906. In block 906, the method 608 creates new bundles and deletes all bundles. In one implementation, each page is automatically bundle rooted at the code file for that page, each third-party package is automatically a bundle, the root of the project is automatically a bundle, and the "boot" bundle contains the runtime files needed. Next the method 608 in block 908, begins a linking and writing loop including steps 910 to 918 for each source file in topological order. In block 910, the method 608 determines whether the source file is: 1) a code or style file; 2) a raw file; or 3) or a neighboring bundle. If in block 910, the source files found to be a code or style file, the method 608 proceeds to block 912 where the source code is linked into a file and assigned to a bundle. For example, if the source file is source code, the code is linked into a single file, the linked code asset, and assigned to the bundle. If the source file is a stylesheet, the stylesheet is linked into a single file, the style asset, and assigned to the bundle. If in block 910, the source file is determined to be a raw file such as an image file, the method 608 proceeds to block 914 and copies the raw file into the build folder. Finally, if in block 910 the method 608 determines that the source file is a neighboring bundle (e.g., a package bundle), the method 608 copies the neighboring bundle including any code, style and assets over to the bundle. After either block 912, 914 or 916, the method 608 proceeds to determine 918 whether there are additional source files. If it is determined that there are additional source files, the method 608 loops to block 908 and repeats blocks 910 to 918 for another source file. If it is determined that there are no additional source files, the method 608 proceeds to block 920 and writes the linked files. For example, the linked files may be written or stored in the build target directory 302. The linked code file is written if it has at least one code file inside it, and the style file is written if it has at least one style file inside it. In some implementations, block 920 includes writing a loader.js runtime file. The loader.js runtime file is code that allows the browser code to import other code, just like it does in the server. The browser does not have this ability natively. Block 920 may also include writing a bundle.js runtime file. This file contains a map of all the bundles in the application. The loader uses this file to figure out which code and style files need to be loaded for each page. It also allows the bundle to prefetch all of the assets for the entire web site, even before a user has navigated to that page. After block 920, the method 608 continues to determine 922 whether there is another target that needs to be written and linked. If so, the method 608 proceeds from block 922 to block 904 so that steps 904 to 924 can be repeated for another target. If it is determined 922 that there is not another target, the process is complete and ends. It should be understood that the present disclosure advantageously creates these bundles on a page basis so that any code affecting only a single page needs to be re-bundled in the event of a change.

Figure 10:
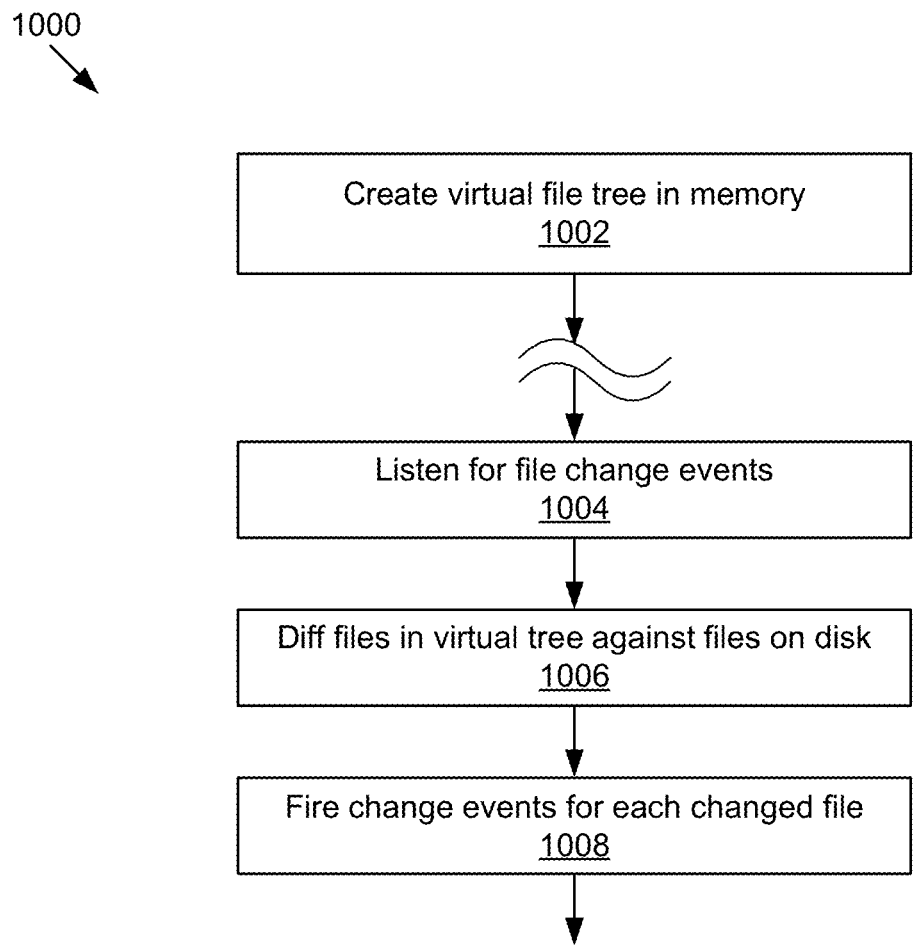
FIG. 10 is a flowchart of an example method for file watching in accordance with the present disclosure.

Referring now to FIG. 10, one implementation of the method 1000 for file watching in accordance with the present disclosure is described. The method 1000 begins by starting the build tool 204 in a watch mode to detect changes to any files in a source project. The method 1100 begins by creating a virtual file tree in memory 504. For example, as the developer is modifying the code or monitoring its operation, the virtual file tree may be stored in the memory 504 of the computing device 102 or the development server 104. The code is allowed to operate and during its operation, and as the developer is modifying the code, the file watching engine 246 in block 1004 listens or monitors for file change events. The method 1000 the performs a diff 1006 of the files in the virtual file tree against files stored on disk. The diff algorithm as has been described above with reference to the file watching engine 246. The method 1000 then generates 1008 files change events for each changed file.

Figure 11:
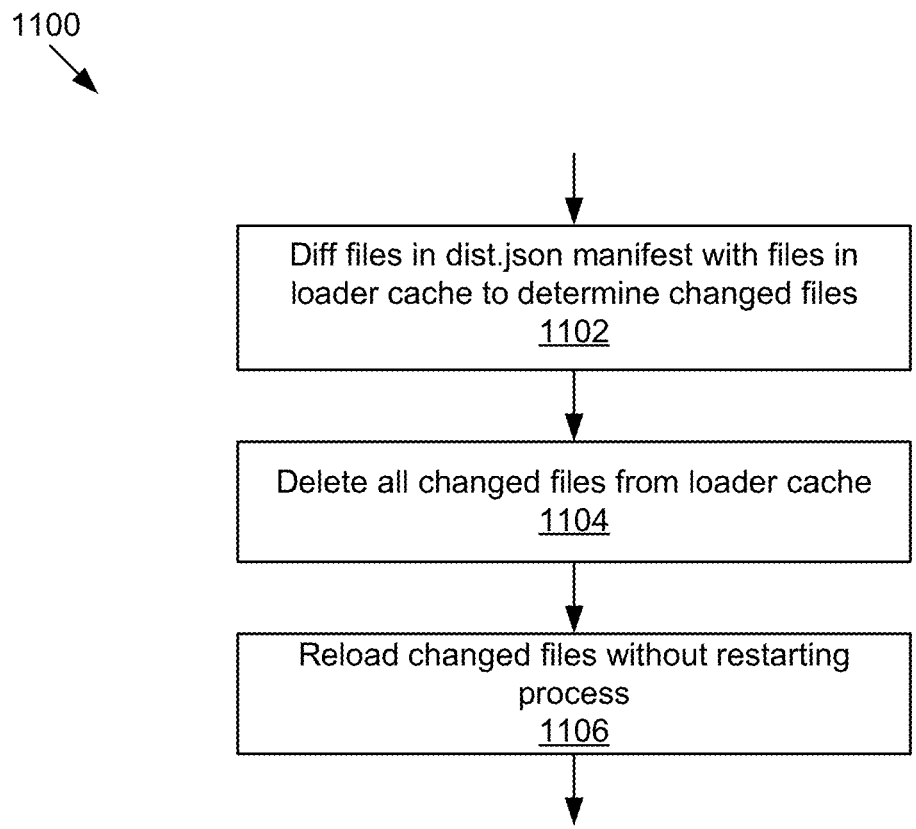
FIG. 11 is a flowchart of an example method for hot reloading in accordance with the present disclosure.

Referring now to FIG. 11, one implementation of the method 1100 for hot reloading in accordance with the present disclosure is described below. The method 1100 begins by performing 1102 a diff of files in the distribution manifest file 304 (e.g., "dist.json file") with files in loader cache to determine changed files. Next, the method 1100 deletes 1104 all changed files from loader cache. Then the method 1100 reloads changed files without restarting process.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Although the preceding description uses terms first, second, etc. to describe various elements, these elements should not be limited by the terms. These terms are only used to distinguish one element from another.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

Appendix A

Example distribution manifest file 304 (e.g., "dist.json file").

```
{
  "env": "dev",
  "time": "2020-07-08T11:35:36-07:00",
  "assetPath": "assets",
  "assetUrl": "/assets",
  "targets": {
    "browser": {
      "files": {
        "assets/app/pages/home/index.css": {
          "url": "/assets/app/pages/home/index.css?version=fe841bd5d8d644ec2624",
          "version": "fe841bd5d8d644ec2624",
          "size": 263,
          "source": "project/app/pages/home/index.tsx"
        },
        "assets/app/pages/home/index.css.gz": {
          "url": "/assets/app/pages/home/index.css.gz?version=fe841bd5d8d644ec2624",
          "version": "fe841bd5d8d644ec2624",
          "size": 195,
          "source": "project/app/pages/home/index.tsx"
        },
        "assets/app/pages/home/index.css.map": {
          "url": "/assets/app/pages/home/index.css.map?version=fe841bd5d8d644ec2624",
          "version": "fe841bd5d8d644ec2624",
          "size": 664,
          "source": "project/app/pages/home/index.tsx"
        },
        "assets/app/pages/home/index.css.map.gz": {
          "url": "/assets/app/pages/home/index.css.map.gz?version=fe841bd5d8d644ec2624",
          "version": "fe841bd5d8d644ec2624",
          "size": 342,
          "source": "project/app/pages/home/index.tsx"
        },
        "assets/app/pages/home/index.js": {
          "url": "/assets/app/pages/home/index.js?version=1100027294d4d2610768",
          "version": "1100027294d4d2610768",
          "size": 2259,
          "source": "project/app/pages/home/index.tsx"
        },
        "assets/app/pages/home/index.js.gz": {
          "url": "/assets/app/pages/home/index.js.gz?version=1100027294d4d2610768",
          "version": "1100027294d4d2610768",
          "size": 926,
          "source": "project/app/pages/home/index.tsx"
        },
        "assets/app/pages/home/index.js.map": {
```

```
    "url":
"/assets/app/pages/home/index.js.map?version=1100027294d4d2610768",
      "version": "1100027294d4d2610768",
      "size": 1114,
      "source": "project/app/pages/home/index.tsx"
    },
    "assets/app/pages/home/index.js.map.gz": {
      "url":
"/assets/app/pages/home/index.js.map.gz?version=1100027294d4d2610768",
      "version": "1100027294d4d2610768",
      "size": 564,
      "source": "project/app/pages/home/index.tsx"
    },
    "assets/app/pages/not-found/index.css": {
      "url": "/assets/app/pages/not-
found/index.css?version=bb62c25975dc7e1b4b84",
      "version": "bb62c25975dc7e1b4b84",
      "size": 135,
      "source": "project/app/pages/not-found/index.tsx"
    },
    "assets/app/pages/not-found/index.css.gz": {
      "url": "/assets/app/pages/not-
found/index.css.gz?version=bb62c25975dc7e1b4b84",
      "version": "bb62c25975dc7e1b4b84",
      "size": 115,
      "source": "project/app/pages/not-found/index.tsx"
    },
    "assets/app/pages/not-found/index.css.map": {
      "url": "/assets/app/pages/not-
found/index.css.map?version=bb62c25975dc7e1b4b84",
      "version": "bb62c25975dc7e1b4b84",
      "size": 448,
      "source": "project/app/pages/not-found/index.tsx"
    },
    "assets/app/pages/not-found/index.css.map.gz": {
      "url": "/assets/app/pages/not-
found/index.css.map.gz?version=bb62c25975dc7e1b4b84",
      "version": "bb62c25975dc7e1b4b84",
      "size": 229,
      "source": "project/app/pages/not-found/index.tsx"
    },
    "assets/app/pages/not-found/index.js": {
      "url": "/assets/app/pages/not-
found/index.js?version=511ac6c6a0ef74368e5a",
      "version": "511ac6c6a0ef74368e5a",
      "size": 2538,
      "source": "project/app/pages/not-found/index.tsx"
    },
    "assets/app/pages/not-found/index.js.gz": {
      "url": "/assets/app/pages/not-
found/index.js.gz?version=511ac6c6a0ef74368e5a",
      "version": "511ac6c6a0ef74368e5a",
      "size": 992,
      "source": "project/app/pages/not-found/index.tsx"
    },
    "assets/app/pages/not-found/index.js.map": {
```

```
        "url": "/assets/app/pages/not-
found/index.js.map?version=511ac6c6a0ef74368e5a",
        "version": "511ac6c6a0ef74368e5a",
        "size": 1323,
        "source": "project/app/pages/not-found/index.tsx"
      },
      "assets/app/pages/not-found/index.js.map.gz": {
        "url": "/assets/app/pages/not-
found/index.js.map.gz?version=511ac6c6a0ef74368e5a",
        "version": "511ac6c6a0ef74368e5a",
        "size": 648,
        "source": "project/app/pages/not-found/index.tsx"
      },
      "assets/app/pages/unhandled/index.css": {
        "url":
"/assets/app/pages/unhandled/index.css?version=0f1d6803376acc82fd19",
        "version": "0f1d6803376acc82fd19",
        "size": 135,
        "source": "project/app/pages/unhandled/index.tsx"
      },
      "assets/app/pages/unhandled/index.css.gz": {
        "url":
"/assets/app/pages/unhandled/index.css.gz?version=0f1d6803376acc82fd19",
        "version": "0f1d6803376acc82fd19",
        "size": 115,
        "source": "project/app/pages/unhandled/index.tsx"
      },
      "assets/app/pages/unhandled/index.css.map": {
        "url":
"/assets/app/pages/unhandled/index.css.map?version=0f1d6803376acc82fd19",
        "version": "0f1d6803376acc82fd19",
        "size": 448,
        "source": "project/app/pages/unhandled/index.tsx"
      },
      "assets/app/pages/unhandled/index.css.map.gz": {
        "url":
"/assets/app/pages/unhandled/index.css.map.gz?version=0f1d6803376acc82fd19",
        "version": "0f1d6803376acc82fd19",
        "size": 229,
        "source": "project/app/pages/unhandled/index.tsx"
      },
      "assets/app/pages/unhandled/index.js": {
        "url":
"/assets/app/pages/unhandled/index.js?version=5a68c1e4dd40aad7e7bb",
        "version": "5a68c1e4dd40aad7e7bb",
        "size": 2561,
        "source": "project/app/pages/unhandled/index.tsx"
      },
      "assets/app/pages/unhandled/index.js.gz": {
        "url":
"/assets/app/pages/unhandled/index.js.gz?version=5a68c1e4dd40aad7e7bb",
        "version": "5a68c1e4dd40aad7e7bb",
        "size": 989,
        "source": "project/app/pages/unhandled/index.tsx"
      },
      "assets/app/pages/unhandled/index.js.map": {
```

```
            "url":
"/assets/app/pages/unhandled/index.js.map?version=5a68c1e4dd40aad7e7bb",
            "version": "5a68c1e4dd40aad7e7bb",
            "size": 1346,
            "source": "project/app/pages/unhandled/index.tsx"
        },
        "assets/app/pages/unhandled/index.js.map.gz": {
            "url":
"/assets/app/pages/unhandled/index.js.map.gz?version=5a68c1e4dd40aad7e7bb",
            "version": "5a68c1e4dd40aad7e7bb",
            "size": 650,
            "source": "project/app/pages/unhandled/index.tsx"
        },
        "assets/bundle.js": {
            "url": "/assets/bundle.js?version=18f53fcb844b06ce3bcb",
            "version": "18f53fcb844b06ce3bcb",
            "size": 8086
        },
        "assets/bundle.js.gz": {
            "url": "/assets/bundle.js.gz?version=18f53fcb844b06ce3bcb",
            "version": "18f53fcb844b06ce3bcb",
            "size": 1231
        },
        "assets/index.js": {
            "url": "/assets/index.js?version=86b7a215993f17631e47",
            "version": "86b7a215993f17631e47",
            "size": 11846,
            "source": "project/index.ts"
        },
        "assets/index.js.gz": {
            "url": "/assets/index.js.gz?version=86b7a215993f17631e47",
            "version": "86b7a215993f17631e47",
            "size": 2112,
            "source": "project/index.ts"
        },
        "assets/index.js.map": {
            "url": "/assets/index.js.map?version=86b7a215993f17631e47",
            "version": "86b7a215993f17631e47",
            "size": 5776,
            "source": "project/index.ts"
        },
        "assets/index.js.map.gz": {
            "url": "/assets/index.js.map.gz?version=86b7a215993f17631e47",
            "version": "86b7a215993f17631e47",
            "size": 1371,
            "source": "project/index.ts"
        },
        "assets/loader.js": {
            "url": "/assets/loader.js?version=315c09152b035f4288d4",
            "version": "315c09152b035f4288d4",
            "size": 14012
        },
        "assets/loader.js.gz": {
            "url": "/assets/loader.js.gz?version=315c09152b035f4288d4",
            "version": "315c09152b035f4288d4",
            "size": 3114
        },
```

```
    "assets/packages/@elements/application/0.0.0/index.js": {
      "url":
"/assets/packages/@elements/application/0.0.0/index.js?version=4694ce411e4c3b
e0c357",
      "version": "4694ce411e4c3be0c357",
      "size": 128959,
      "source": "packages/@elements/application/0.0.0/index.js"
    },
    "assets/packages/@elements/application/0.0.0/index.js.gz": {
      "url":
"/assets/packages/@elements/application/0.0.0/index.js.gz?version=4694ce411e4
c3be0c357",
      "version": "4694ce411e4c3be0c357",
      "size": 22279,
      "source": "packages/@elements/application/0.0.0/index.js"
    },
    "assets/packages/@elements/application/0.0.0/index.js.map": {
      "url":
"/assets/packages/@elements/application/0.0.0/index.js.map?version=4694ce411e
4c3be0c357",
      "version": "4694ce411e4c3be0c357",
      "size": 103,
      "source": "packages/@elements/application/0.0.0/index.js"
    },
    "assets/packages/@elements/application/0.0.0/index.js.map.gz": {
      "url":
"/assets/packages/@elements/application/0.0.0/index.js.map.gz?version=4694ce4
11e4c3be0c357",
      "version": "4694ce411e4c3be0c357",
      "size": 118,
      "source": "packages/@elements/application/0.0.0/index.js"
    },
    "assets/packages/@elements/json/1.0.0-alpha.18/index.js": {
      "url": "/assets/packages/@elements/json/1.0.0-
alpha.18/index.js?version=c7efa6e046ddf137b611",
      "version": "c7efa6e046ddf137b611",
      "size": 33421,
      "source": "packages/@elements/json/1.0.0-alpha.18/index.js"
    },
    "assets/packages/@elements/json/1.0.0-alpha.18/index.js.gz": {
      "url": "/assets/packages/@elements/json/1.0.0-
alpha.18/index.js.gz?version=c7efa6e046ddf137b611",
      "version": "c7efa6e046ddf137b611",
      "size": 6755,
      "source": "packages/@elements/json/1.0.0-alpha.18/index.js"
    },
    "assets/packages/@elements/json/1.0.0-alpha.18/index.js.map": {
      "url": "/assets/packages/@elements/json/1.0.0-
alpha.18/index.js.map?version=c7efa6e046ddf137b611",
      "version": "c7efa6e046ddf137b611",
      "size": 105,
      "source": "packages/@elements/json/1.0.0-alpha.18/index.js"
    },
    "assets/packages/@elements/json/1.0.0-alpha.18/index.js.map.gz": {
      "url": "/assets/packages/@elements/json/1.0.0-
alpha.18/index.js.map.gz?version=c7efa6e046ddf137b611",
      "version": "c7efa6e046ddf137b611",
```

```
              "size": 122,
              "source": "packages/@elements/json/1.0.0-alpha.18/index.js"
          },
          "assets/packages/@elements/runtime/1.0.0-alpha.19/index.js": {
              "url": "/assets/packages/@elements/runtime/1.0.0-
alpha.19/index.js?version=e21ccb1e126efd5bc7d7",
              "version": "e21ccb1e126efd5bc7d7",
              "size": 66607,
              "source": "packages/@elements/runtime/1.0.0-alpha.19/index.js"
          },
          "assets/packages/@elements/runtime/1.0.0-alpha.19/index.js.gz": {
              "url": "/assets/packages/@elements/runtime/1.0.0-
alpha.19/index.js.gz?version=e21ccb1e126efd5bc7d7",
              "version": "e21ccb1e126efd5bc7d7",
              "size": 10509,
              "source": "packages/@elements/runtime/1.0.0-alpha.19/index.js"
          },
          "assets/packages/@elements/runtime/1.0.0-alpha.19/index.js.map": {
              "url": "/assets/packages/@elements/runtime/1.0.0-
alpha.19/index.js.map?version=e21ccb1e126efd5bc7d7",
              "version": "e21ccb1e126efd5bc7d7",
              "size": 108,
              "source": "packages/@elements/runtime/1.0.0-alpha.19/index.js"
          },
          "assets/packages/@elements/runtime/1.0.0-alpha.19/index.js.map.gz": {
              "url": "/assets/packages/@elements/runtime/1.0.0-
alpha.19/index.js.map.gz?version=e21ccb1e126efd5bc7d7",
              "version": "e21ccb1e126efd5bc7d7",
              "size": 123,
              "source": "packages/@elements/runtime/1.0.0-alpha.19/index.js"
          },
          "assets/packages/@elements/utils/1.0.0-alpha.18/index.js": {
              "url": "/assets/packages/@elements/utils/1.0.0-
alpha.18/index.js?version=c7aeecbe2385dc132d48",
              "version": "c7aeecbe2385dc132d48",
              "size": 24865,
              "source": "packages/@elements/utils/1.0.0-alpha.18/index.js"
          },
          "assets/packages/@elements/utils/1.0.0-alpha.18/index.js.gz": {
              "url": "/assets/packages/@elements/utils/1.0.0-
alpha.18/index.js.gz?version=c7aeecbe2385dc132d48",
              "version": "c7aeecbe2385dc132d48",
              "size": 5426,
              "source": "packages/@elements/utils/1.0.0-alpha.18/index.js"
          },
          "assets/packages/@elements/utils/1.0.0-alpha.18/index.js.map": {
              "url": "/assets/packages/@elements/utils/1.0.0-
alpha.18/index.js.map?version=c7aeecbe2385dc132d48",
              "version": "c7aeecbe2385dc132d48",
              "size": 106,
              "source": "packages/@elements/utils/1.0.0-alpha.18/index.js"
          },
          "assets/packages/@elements/utils/1.0.0-alpha.18/index.js.map.gz": {
              "url": "/assets/packages/@elements/utils/1.0.0-
alpha.18/index.js.map.gz?version=c7aeecbe2385dc132d48",
              "version": "c7aeecbe2385dc132d48",
              "size": 123,
```

```
            "source": "packages/@elements/utils/1.0.0-alpha.18/index.js"
        },
        "assets/packages/base64-url/2.3.3/index.js": {
            "url": "/assets/packages/base64-
url/2.3.3/index.js?version=a321d502b026bafba657",
            "version": "a321d502b026bafba657",
            "size": 1519,
            "source": "packages/base64-url/2.3.3/index.js"
        },
        "assets/packages/base64-url/2.3.3/index.js.gz": {
            "url": "/assets/packages/base64-
url/2.3.3/index.js.gz?version=a321d502b026bafba657",
            "version": "a321d502b026bafba657",
            "size": 625,
            "source": "packages/base64-url/2.3.3/index.js"
        },
        "assets/packages/base64-url/2.3.3/index.js.map": {
            "url": "/assets/packages/base64-
url/2.3.3/index.js.map?version=a321d502b026bafba657",
            "version": "a321d502b026bafba657",
            "size": 92,
            "source": "packages/base64-url/2.3.3/index.js"
        },
        "assets/packages/base64-url/2.3.3/index.js.map.gz": {
            "url": "/assets/packages/base64-
url/2.3.3/index.js.map.gz?version=a321d502b026bafba657",
            "version": "a321d502b026bafba657",
            "size": 111,
            "source": "packages/base64-url/2.3.3/index.js"
        },
        "assets/packages/debug/4.1.1/src/browser.js": {
            "url":
"/assets/packages/debug/4.1.1/src/browser.js?version=3e7c5e3573ef430fbd91",
            "version": "3e7c5e3573ef430fbd91",
            "size": 17372,
            "source": "packages/debug/4.1.1/src/browser.js"
        },
        "assets/packages/debug/4.1.1/src/browser.js.gz": {
            "url":
"/assets/packages/debug/4.1.1/src/browser.js.gz?version=3e7c5e3573ef430fbd91"
,
            "version": "3e7c5e3573ef430fbd91",
            "size": 4709,
            "source": "packages/debug/4.1.1/src/browser.js"
        },
        "assets/packages/debug/4.1.1/src/browser.js.map": {
            "url":
"/assets/packages/debug/4.1.1/src/browser.js.map?version=3e7c5e3573ef430fbd91
",
            "version": "3e7c5e3573ef430fbd91",
            "size": 93,
            "source": "packages/debug/4.1.1/src/browser.js"
        },
        "assets/packages/debug/4.1.1/src/browser.js.map.gz": {
            "url":
"/assets/packages/debug/4.1.1/src/browser.js.map.gz?version=3e7c5e3573ef430fb
d91",
```

```
            "version": "3e7c5e3573ef430fbd91",
            "size": 112,
            "source": "packages/debug/4.1.1/src/browser.js"
        },
        "assets/packages/debug/4.1.1/src/index.js": {
            "url":
"/assets/packages/debug/4.1.1/src/index.js?version=d0af6a5ce8a07f1186cc",
            "version": "d0af6a5ce8a07f1186cc",
            "size": 16758,
            "source": "packages/debug/4.1.1/src/index.js"
        },
        "assets/packages/debug/4.1.1/src/index.js.gz": {
            "url":
"/assets/packages/debug/4.1.1/src/index.js.gz?version=d0af6a5ce8a07f1186cc",
            "version": "d0af6a5ce8a07f1186cc",
            "size": 4482,
            "source": "packages/debug/4.1.1/src/index.js"
        },
        "assets/packages/debug/4.1.1/src/index.js.map": {
            "url":
"/assets/packages/debug/4.1.1/src/index.js.map?version=d0af6a5ce8a07f1186cc",
            "version": "d0af6a5ce8a07f1186cc",
            "size": 91,
            "source": "packages/debug/4.1.1/src/index.js"
        },
        "assets/packages/debug/4.1.1/src/index.js.map.gz": {
            "url":
"/assets/packages/debug/4.1.1/src/index.js.map.gz?version=d0af6a5ce8a07f1186c
c",
            "version": "d0af6a5ce8a07f1186cc",
            "size": 110,
            "source": "packages/debug/4.1.1/src/index.js"
        },
        "assets/packages/mime/2.4.6/index.js": {
            "url":
"/assets/packages/mime/2.4.6/index.js?version=468c716b06149be920bb",
            "version": "468c716b06149be920bb",
            "size": 40147,
            "source": "packages/mime/2.4.6/index.js"
        },
        "assets/packages/mime/2.4.6/index.js.gz": {
            "url":
"/assets/packages/mime/2.4.6/index.js.gz?version=468c716b06149be920bb",
            "version": "468c716b06149be920bb",
            "size": 11353,
            "source": "packages/mime/2.4.6/index.js"
        },
        "assets/packages/mime/2.4.6/index.js.map": {
            "url":
"/assets/packages/mime/2.4.6/index.js.map?version=468c716b06149be920bb",
            "version": "468c716b06149be920bb",
            "size": 86,
            "source": "packages/mime/2.4.6/index.js"
        },
        "assets/packages/mime/2.4.6/index.js.map.gz": {
            "url":
"/assets/packages/mime/2.4.6/index.js.map.gz?version=468c716b06149be920bb",
```

```
          "version": "468c716b06149be920bb",
          "size": 105,
          "source": "packages/mime/2.4.6/index.js"
        },
        "assets/packages/ms/2.1.2/index.js": {
          "url":
"/assets/packages/ms/2.1.2/index.js?version=54e12330d0aef13cfa5c",
          "version": "54e12330d0aef13cfa5c",
          "size": 5222,
          "source": "packages/ms/2.1.2/index.js"
        },
        "assets/packages/ms/2.1.2/index.js.gz": {
          "url":
"/assets/packages/ms/2.1.2/index.js.gz?version=54e12330d0aef13cfa5c",
          "version": "54e12330d0aef13cfa5c",
          "size": 1401,
          "source": "packages/ms/2.1.2/index.js"
        },
        "assets/packages/ms/2.1.2/index.js.map": {
          "url":
"/assets/packages/ms/2.1.2/index.js.map?version=54e12330d0aef13cfa5c",
          "version": "54e12330d0aef13cfa5c",
          "size": 84,
          "source": "packages/ms/2.1.2/index.js"
        },
        "assets/packages/ms/2.1.2/index.js.map.gz": {
          "url":
"/assets/packages/ms/2.1.2/index.js.map.gz?version=54e12330d0aef13cfa5c",
          "version": "54e12330d0aef13cfa5c",
          "size": 103,
          "source": "packages/ms/2.1.2/index.js"
        },
        "assets/packages/object-assign/4.1.1/index.js": {
          "url": "/assets/packages/object-
assign/4.1.1/index.js?version=54ec954fe8966ae64148",
          "version": "54ec954fe8966ae64148",
          "size": 3601,
          "source": "packages/object-assign/4.1.1/index.js"
        },
        "assets/packages/object-assign/4.1.1/index.js.gz": {
          "url": "/assets/packages/object-
assign/4.1.1/index.js.gz?version=54ec954fe8966ae64148",
          "version": "54ec954fe8966ae64148",
          "size": 1280,
          "source": "packages/object-assign/4.1.1/index.js"
        },
        "assets/packages/object-assign/4.1.1/index.js.map": {
          "url": "/assets/packages/object-
assign/4.1.1/index.js.map?version=54ec954fe8966ae64148",
          "version": "54ec954fe8966ae64148",
          "size": 95,
          "source": "packages/object-assign/4.1.1/index.js"
        },
        "assets/packages/object-assign/4.1.1/index.js.map.gz": {
          "url": "/assets/packages/object-
assign/4.1.1/index.js.map.gz?version=54ec954fe8966ae64148",
          "version": "54ec954fe8966ae64148",
```

```
      "size": 111,
      "source": "packages/object-assign/4.1.1/index.js"
    },
    "assets/packages/path-to-regexp/6.1.0/dist/index.js": {
      "url": "/assets/packages/path-to-
regexp/6.1.0/dist/index.js?version=d3dcf60780e2c4c27665",
      "version": "d3dcf60780e2c4c27665",
      "size": 19157,
      "source": "packages/path-to-regexp/6.1.0/dist/index.js"
    },
    "assets/packages/path-to-regexp/6.1.0/dist/index.js.gz": {
      "url": "/assets/packages/path-to-
regexp/6.1.0/dist/index.js.gz?version=d3dcf60780e2c4c27665",
      "version": "d3dcf60780e2c4c27665",
      "size": 3913,
      "source": "packages/path-to-regexp/6.1.0/dist/index.js"
    },
    "assets/packages/path-to-regexp/6.1.0/dist/index.js.map": {
      "url": "/assets/packages/path-to-
regexp/6.1.0/dist/index.js.map?version=d3dcf60780e2c4c27665",
      "version": "d3dcf60780e2c4c27665",
      "size": 101,
      "source": "packages/path-to-regexp/6.1.0/dist/index.js"
    },
    "assets/packages/path-to-regexp/6.1.0/dist/index.js.map.gz": {
      "url": "/assets/packages/path-to-
regexp/6.1.0/dist/index.js.map.gz?version=d3dcf60780e2c4c27665",
      "version": "d3dcf60780e2c4c27665",
      "size": 118,
      "source": "packages/path-to-regexp/6.1.0/dist/index.js"
    },
    "assets/packages/prop-types/15.7.2/checkPropTypes.js": {
      "url": "/assets/packages/prop-
types/15.7.2/checkPropTypes.js?version=577dc59de2094a2144b6",
      "version": "577dc59de2094a2144b6",
      "size": 6164,
      "source": "packages/prop-types/15.7.2/checkPropTypes.js"
    },
    "assets/packages/prop-types/15.7.2/checkPropTypes.js.gz": {
      "url": "/assets/packages/prop-
types/15.7.2/checkPropTypes.js.gz?version=577dc59de2094a2144b6",
      "version": "577dc59de2094a2144b6",
      "size": 1938,
      "source": "packages/prop-types/15.7.2/checkPropTypes.js"
    },
    "assets/packages/prop-types/15.7.2/checkPropTypes.js.map": {
      "url": "/assets/packages/prop-
types/15.7.2/checkPropTypes.js.map?version=577dc59de2094a2144b6",
      "version": "577dc59de2094a2144b6",
      "size": 102,
      "source": "packages/prop-types/15.7.2/checkPropTypes.js"
    },
    "assets/packages/prop-types/15.7.2/checkPropTypes.js.map.gz": {
      "url": "/assets/packages/prop-
types/15.7.2/checkPropTypes.js.map.gz?version=577dc59de2094a2144b6",
      "version": "577dc59de2094a2144b6",
      "size": 119,
```

```
      "source": "packages/prop-types/15.7.2/checkPropTypes.js"
    },
    "assets/packages/prop-types/15.7.2/index.js": {
      "url": "/assets/packages/prop-types/15.7.2/index.js?version=a5e6d60f5dab968ff718",
      "version": "a5e6d60f5dab968ff718",
      "size": 32378,
      "source": "packages/prop-types/15.7.2/index.js"
    },
    "assets/packages/prop-types/15.7.2/index.js.gz": {
      "url": "/assets/packages/prop-types/15.7.2/index.js.gz?version=a5e6d60f5dab968ff718",
      "version": "a5e6d60f5dab968ff718",
      "size": 6171,
      "source": "packages/prop-types/15.7.2/index.js"
    },
    "assets/packages/prop-types/15.7.2/index.js.map": {
      "url": "/assets/packages/prop-types/15.7.2/index.js.map?version=a5e6d60f5dab968ff718",
      "version": "a5e6d60f5dab968ff718",
      "size": 93,
      "source": "packages/prop-types/15.7.2/index.js"
    },
    "assets/packages/prop-types/15.7.2/index.js.map.gz": {
      "url": "/assets/packages/prop-types/15.7.2/index.js.map.gz?version=a5e6d60f5dab968ff718",
      "version": "a5e6d60f5dab968ff718",
      "size": 112,
      "source": "packages/prop-types/15.7.2/index.js"
    },
    "assets/packages/querystringify/2.1.1/index.js": {
      "url": "/assets/packages/querystringify/2.1.1/index.js?version=91d11d80a7336d4ccf35",
      "version": "91d11d80a7336d4ccf35",
      "size": 4344,
      "source": "packages/querystringify/2.1.1/index.js"
    },
    "assets/packages/querystringify/2.1.1/index.js.gz": {
      "url": "/assets/packages/querystringify/2.1.1/index.js.gz?version=91d11d80a7336d4ccf35",
      "version": "91d11d80a7336d4ccf35",
      "size": 1426,
      "source": "packages/querystringify/2.1.1/index.js"
    },
    "assets/packages/querystringify/2.1.1/index.js.map": {
      "url": "/assets/packages/querystringify/2.1.1/index.js.map?version=91d11d80a7336d4ccf35",
      "version": "91d11d80a7336d4ccf35",
      "size": 96,
      "source": "packages/querystringify/2.1.1/index.js"
    },
    "assets/packages/querystringify/2.1.1/index.js.map.gz": {
```

```
        "url":
"/assets/packages/querystringify/2.1.1/index.js.map.gz?version=91d11d80a7336d
4ccf35",
        "version": "91d11d80a7336d4ccf35",
        "size": 114,
        "source": "packages/querystringify/2.1.1/index.js"
    },
    "assets/packages/react-dom/16.13.1/index.js": {
        "url": "/assets/packages/react-
dom/16.13.1/index.js?version=752b31a5a81a3ae7c7b7",
        "version": "752b31a5a81a3ae7c7b7",
        "size": 1190470,
        "source": "packages/react-dom/16.13.1/index.js"
    },
    "assets/packages/react-dom/16.13.1/index.js.gz": {
        "url": "/assets/packages/react-
dom/16.13.1/index.js.gz?version=752b31a5a81a3ae7c7b7",
        "version": "752b31a5a81a3ae7c7b7",
        "size": 245566,
        "source": "packages/react-dom/16.13.1/index.js"
    },
    "assets/packages/react-dom/16.13.1/index.js.map": {
        "url": "/assets/packages/react-
dom/16.13.1/index.js.map?version=752b31a5a81a3ae7c7b7",
        "version": "752b31a5a81a3ae7c7b7",
        "size": 93,
        "source": "packages/react-dom/16.13.1/index.js"
    },
    "assets/packages/react-dom/16.13.1/index.js.map.gz": {
        "url": "/assets/packages/react-
dom/16.13.1/index.js.map.gz?version=752b31a5a81a3ae7c7b7",
        "version": "752b31a5a81a3ae7c7b7",
        "size": 112,
        "source": "packages/react-dom/16.13.1/index.js"
    },
    "assets/packages/react-dom/16.13.1/server.browser.js": {
        "url": "/assets/packages/react-
dom/16.13.1/server.browser.js?version=1a21ecd2d55eecf41cfc",
        "version": "1a21ecd2d55eecf41cfc",
        "size": 185513,
        "source": "packages/react-dom/16.13.1/server.browser.js"
    },
    "assets/packages/react-dom/16.13.1/server.browser.js.gz": {
        "url": "/assets/packages/react-
dom/16.13.1/server.browser.js.gz?version=1a21ecd2d55eecf41cfc",
        "version": "1a21ecd2d55eecf41cfc",
        "size": 44187,
        "source": "packages/react-dom/16.13.1/server.browser.js"
    },
    "assets/packages/react-dom/16.13.1/server.browser.js.map": {
        "url": "/assets/packages/react-
dom/16.13.1/server.browser.js.map?version=1a21ecd2d55eecf41cfc",
        "version": "1a21ecd2d55eecf41cfc",
        "size": 102,
        "source": "packages/react-dom/16.13.1/server.browser.js"
    },
    "assets/packages/react-dom/16.13.1/server.browser.js.map.gz": {
```

```
        "url": "/assets/packages/react-
dom/16.13.1/server.browser.js.map.gz?version=1a21ecd2d55eecf41cfc",
        "version": "1a21ecd2d55eecf41cfc",
        "size": 118,
        "source": "packages/react-dom/16.13.1/server.browser.js"
    },
    "assets/packages/react-dom/16.13.1/server.js": {
        "url": "/assets/packages/react-
dom/16.13.1/server.js?version=a1caa34976f87b3680d3",
        "version": "a1caa34976f87b3680d3",
        "size": 187902,
        "source": "packages/react-dom/16.13.1/server.js"
    },
    "assets/packages/react-dom/16.13.1/server.js.gz": {
        "url": "/assets/packages/react-
dom/16.13.1/server.js.gz?version=a1caa34976f87b3680d3",
        "version": "a1caa34976f87b3680d3",
        "size": 44648,
        "source": "packages/react-dom/16.13.1/server.js"
    },
    "assets/packages/react-dom/16.13.1/server.js.map": {
        "url": "/assets/packages/react-
dom/16.13.1/server.js.map?version=a1caa34976f87b3680d3",
        "version": "a1caa34976f87b3680d3",
        "size": 94,
        "source": "packages/react-dom/16.13.1/server.js"
    },
    "assets/packages/react-dom/16.13.1/server.js.map.gz": {
        "url": "/assets/packages/react-
dom/16.13.1/server.js.map.gz?version=a1caa34976f87b3680d3",
        "version": "a1caa34976f87b3680d3",
        "size": 113,
        "source": "packages/react-dom/16.13.1/server.js"
    },
    "assets/packages/react-is/16.13.1/index.js": {
        "url": "/assets/packages/react-
is/16.13.1/index.js?version=5a3798d6c27531793ade",
        "version": "5a3798d6c27531793ade",
        "size": 12838,
        "source": "packages/react-is/16.13.1/index.js"
    },
    "assets/packages/react-is/16.13.1/index.js.gz": {
        "url": "/assets/packages/react-
is/16.13.1/index.js.gz?version=5a3798d6c27531793ade",
        "version": "5a3798d6c27531793ade",
        "size": 2895,
        "source": "packages/react-is/16.13.1/index.js"
    },
    "assets/packages/react-is/16.13.1/index.js.map": {
        "url": "/assets/packages/react-
is/16.13.1/index.js.map?version=5a3798d6c27531793ade",
        "version": "5a3798d6c27531793ade",
        "size": 92,
        "source": "packages/react-is/16.13.1/index.js"
    },
    "assets/packages/react-is/16.13.1/index.js.map.gz": {
```

```
        "url": "/assets/packages/react-
is/16.13.1/index.js.map.gz?version=5a3798d6c27531793ade",
        "version": "5a3798d6c27531793ade",
        "size": 111,
        "source": "packages/react-is/16.13.1/index.js"
    },
    "assets/packages/react/16.13.1/index.js": {
        "url":
"/assets/packages/react/16.13.1/index.js?version=f75cf24333c62dd89c54",
        "version": "f75cf24333c62dd89c54",
        "size": 85159,
        "source": "packages/react/16.13.1/index.js"
    },
    "assets/packages/react/16.13.1/index.js.gz": {
        "url":
"/assets/packages/react/16.13.1/index.js.gz?version=f75cf24333c62dd89c54",
        "version": "f75cf24333c62dd89c54",
        "size": 20177,
        "source": "packages/react/16.13.1/index.js"
    },
    "assets/packages/react/16.13.1/index.js.map": {
        "url":
"/assets/packages/react/16.13.1/index.js.map?version=f75cf24333c62dd89c54",
        "version": "f75cf24333c62dd89c54",
        "size": 89,
        "source": "packages/react/16.13.1/index.js"
    },
    "assets/packages/react/16.13.1/index.js.map.gz": {
        "url":
"/assets/packages/react/16.13.1/index.js.map.gz?version=f75cf24333c62dd89c54"
,
        "version": "f75cf24333c62dd89c54",
        "size": 108,
        "source": "packages/react/16.13.1/index.js"
    },
    "assets/packages/requires-port/1.0.0/index.js": {
        "url": "/assets/packages/requires-
port/1.0.0/index.js?version=f2302565d0e69290b572",
        "version": "f2302565d0e69290b572",
        "size": 1786,
        "source": "packages/requires-port/1.0.0/index.js"
    },
    "assets/packages/requires-port/1.0.0/index.js.gz": {
        "url": "/assets/packages/requires-
port/1.0.0/index.js.gz?version=f2302565d0e69290b572",
        "version": "f2302565d0e69290b572",
        "size": 736,
        "source": "packages/requires-port/1.0.0/index.js"
    },
    "assets/packages/requires-port/1.0.0/index.js.map": {
        "url": "/assets/packages/requires-
port/1.0.0/index.js.map?version=f2302565d0e69290b572",
        "version": "f2302565d0e69290b572",
        "size": 95,
        "source": "packages/requires-port/1.0.0/index.js"
    },
    "assets/packages/requires-port/1.0.0/index.js.map.gz": {
```

```
        "url": "/assets/packages/requires-
port/1.0.0/index.js.map.gz?version=f2302565d0e69290b572",
        "version": "f2302565d0e69290b572",
        "size": 113,
        "source": "packages/requires-port/1.0.0/index.js"
    },
    "assets/packages/scheduler/0.19.1/index.js": {
        "url":
"/assets/packages/scheduler/0.19.1/index.js?version=42707b96144227a9ffae",
        "version": "42707b96144227a9ffae",
        "size": 37675,
        "source": "packages/scheduler/0.19.1/index.js"
    },
    "assets/packages/scheduler/0.19.1/index.js.gz": {
        "url":
"/assets/packages/scheduler/0.19.1/index.js.gz?version=42707b96144227a9ffae",
        "version": "42707b96144227a9ffae",
        "size": 8347,
        "source": "packages/scheduler/0.19.1/index.js"
    },
    "assets/packages/scheduler/0.19.1/index.js.map": {
        "url":
"/assets/packages/scheduler/0.19.1/index.js.map?version=42707b96144227a9ffae"
,
        "version": "42707b96144227a9ffae",
        "size": 92,
        "source": "packages/scheduler/0.19.1/index.js"
    },
    "assets/packages/scheduler/0.19.1/index.js.map.gz": {
        "url":
"/assets/packages/scheduler/0.19.1/index.js.map.gz?version=42707b96144227a9ff
ae",
        "version": "42707b96144227a9ffae",
        "size": 111,
        "source": "packages/scheduler/0.19.1/index.js"
    },
    "assets/packages/scheduler/0.19.1/tracing.js": {
        "url":
"/assets/packages/scheduler/0.19.1/tracing.js?version=9fbe1c6bf4b986c7ec0b",
        "version": "9fbe1c6bf4b986c7ec0b",
        "size": 14391,
        "source": "packages/scheduler/0.19.1/tracing.js"
    },
    "assets/packages/scheduler/0.19.1/tracing.js.gz": {
        "url":
"/assets/packages/scheduler/0.19.1/tracing.js.gz?version=9fbe1c6bf4b986c7ec0b
",
        "version": "9fbe1c6bf4b986c7ec0b",
        "size": 2405,
        "source": "packages/scheduler/0.19.1/tracing.js"
    },
    "assets/packages/scheduler/0.19.1/tracing.js.map": {
        "url":
"/assets/packages/scheduler/0.19.1/tracing.js.map?version=9fbe1c6bf4b986c7ec0
b",
        "version": "9fbe1c6bf4b986c7ec0b",
        "size": 94,
```

```
            "source": "packages/scheduler/0.19.1/tracing.js"
        },
        "assets/packages/scheduler/0.19.1/tracing.js.map.gz": {
            "url":
"/assets/packages/scheduler/0.19.1/tracing.js.map.gz?version=9fbe1c6bf4b986c7
ec0b",
            "version": "9fbe1c6bf4b986c7ec0b",
            "size": 112,
            "source": "packages/scheduler/0.19.1/tracing.js"
        },
        "assets/packages/url-parse/1.4.7/index.js": {
            "url": "/assets/packages/url-
parse/1.4.7/index.js?version=8efd196a46c8e6e55f15",
            "version": "8efd196a46c8e6e55f15",
            "size": 17369,
            "source": "packages/url-parse/1.4.7/index.js"
        },
        "assets/packages/url-parse/1.4.7/index.js.gz": {
            "url": "/assets/packages/url-
parse/1.4.7/index.js.gz?version=8efd196a46c8e6e55f15",
            "version": "8efd196a46c8e6e55f15",
            "size": 4818,
            "source": "packages/url-parse/1.4.7/index.js"
        },
        "assets/packages/url-parse/1.4.7/index.js.map": {
            "url": "/assets/packages/url-
parse/1.4.7/index.js.map?version=8efd196a46c8e6e55f15",
            "version": "8efd196a46c8e6e55f15",
            "size": 91,
            "source": "packages/url-parse/1.4.7/index.js"
        },
        "assets/packages/url-parse/1.4.7/index.js.map.gz": {
            "url": "/assets/packages/url-
parse/1.4.7/index.js.map.gz?version=8efd196a46c8e6e55f15",
            "version": "8efd196a46c8e6e55f15",
            "size": 110,
            "source": "packages/url-parse/1.4.7/index.js"
        },
        "assets/packages/uuid/8.1.0/dist/index.js": {
            "url":
"/assets/packages/uuid/8.1.0/dist/index.js?version=bda464cad95165cfd147",
            "version": "bda464cad95165cfd147",
            "size": 28051,
            "source": "packages/uuid/8.1.0/dist/index.js"
        },
        "assets/packages/uuid/8.1.0/dist/index.js.gz": {
            "url":
"/assets/packages/uuid/8.1.0/dist/index.js.gz?version=bda464cad95165cfd147",
            "version": "bda464cad95165cfd147",
            "size": 6790,
            "source": "packages/uuid/8.1.0/dist/index.js"
        },
        "assets/packages/uuid/8.1.0/dist/index.js.map": {
            "url":
"/assets/packages/uuid/8.1.0/dist/index.js.map?version=bda464cad95165cfd147",
            "version": "bda464cad95165cfd147",
            "size": 91,
```

```
        "source": "packages/uuid/8.1.0/dist/index.js"
      },
      "assets/packages/uuid/8.1.0/dist/index.js.map.gz": {
        "url":
"/assets/packages/uuid/8.1.0/dist/index.js.map.gz?version=bda464cad95165cfd14
7",
        "version": "bda464cad95165cfd147",
        "size": 110,
        "source": "packages/uuid/8.1.0/dist/index.js"
      },
      "assets/packages/ws/7.3.0/index.js": {
        "url":
"/assets/packages/ws/7.3.0/index.js?version=6fdcbc4e9e771810250c",
        "version": "6fdcbc4e9e771810250c",
        "size": 128623,
        "source": "packages/ws/7.3.0/index.js"
      },
      "assets/packages/ws/7.3.0/index.js.gz": {
        "url":
"/assets/packages/ws/7.3.0/index.js.gz?version=6fdcbc4e9e771810250c",
        "version": "6fdcbc4e9e771810250c",
        "size": 22508,
        "source": "packages/ws/7.3.0/index.js"
      },
      "assets/packages/ws/7.3.0/index.js.map": {
        "url":
"/assets/packages/ws/7.3.0/index.js.map?version=6fdcbc4e9e771810250c",
        "version": "6fdcbc4e9e771810250c",
        "size": 84,
        "source": "packages/ws/7.3.0/index.js"
      },
      "assets/packages/ws/7.3.0/index.js.map.gz": {
        "url":
"/assets/packages/ws/7.3.0/index.js.map.gz?version=6fdcbc4e9e771810250c",
        "version": "6fdcbc4e9e771810250c",
        "size": 103,
        "source": "packages/ws/7.3.0/index.js"
      }
    },
    "sources": {
      "packages/@elements/application/0.0.0/index.js":
"assets/packages/@elements/application/0.0.0/index.js",
      "packages/@elements/json/1.0.0-alpha.18/index.js":
"assets/packages/@elements/json/1.0.0-alpha.18/index.js",
      "packages/@elements/runtime/1.0.0-alpha.19/index.js":
"assets/packages/@elements/runtime/1.0.0-alpha.19/index.js",
      "packages/@elements/utils/1.0.0-alpha.18/index.js":
"assets/packages/@elements/utils/1.0.0-alpha.18/index.js",
      "packages/base64-url/2.3.3/index.js": "assets/packages/base64-
url/2.3.3/index.js",
      "packages/debug/4.1.1/src/browser.js":
"assets/packages/debug/4.1.1/src/browser.js",
      "packages/debug/4.1.1/src/index.js":
"assets/packages/debug/4.1.1/src/index.js",
      "packages/mime/2.4.6/index.js":
"assets/packages/mime/2.4.6/index.js",
      "packages/ms/2.1.2/index.js": "assets/packages/ms/2.1.2/index.js",
```

```
    "packages/object-assign/4.1.1/index.js": "assets/packages/object-
assign/4.1.1/index.js",
    "packages/path-to-regexp/6.1.0/dist/index.js": "assets/packages/path-
to-regexp/6.1.0/dist/index.js",
    "packages/prop-types/15.7.2/checkPropTypes.js":
"assets/packages/prop-types/15.7.2/checkPropTypes.js",
    "packages/prop-types/15.7.2/index.js": "assets/packages/prop-
types/15.7.2/index.js",
    "packages/querystringify/2.1.1/index.js":
"assets/packages/querystringify/2.1.1/index.js",
    "packages/react-dom/16.13.1/index.js": "assets/packages/react-
dom/16.13.1/index.js",
    "packages/react-dom/16.13.1/server.js": "assets/packages/react-
dom/16.13.1/server.js",
    "packages/react-is/16.13.1/index.js": "assets/packages/react-
is/16.13.1/index.js",
    "packages/react/16.13.1/index.js":
"assets/packages/react/16.13.1/index.js",
    "packages/requires-port/1.0.0/index.js": "assets/packages/requires-
port/1.0.0/index.js",
    "packages/scheduler/0.19.1/index.js":
"assets/packages/scheduler/0.19.1/index.js",
    "packages/scheduler/0.19.1/tracing.js":
"assets/packages/scheduler/0.19.1/tracing.js",
    "packages/url-parse/1.4.7/index.js": "assets/packages/url-
parse/1.4.7/index.js",
    "packages/uuid/8.1.0/dist/index.js":
"assets/packages/uuid/8.1.0/dist/index.js",
    "packages/ws/7.3.0/index.js": "assets/packages/ws/7.3.0/index.js",
    "project/app/pages/home/index.tsx": "assets/app/pages/home/index.js",
    "project/app/pages/not-found/index.tsx": "assets/app/pages/not-
found/index.js",
    "project/app/pages/unhandled/index.tsx":
"assets/app/pages/unhandled/index.js",
    "project/index.ts": "assets/index.js"
  },
  "bundles": {
    "app": {
      "root": "project/index.ts",
      "version": "e19ffe5b58c255d6ec08",
      "size": 1601801,
      "gzipSize": 333288,
      "code": [
        {
          "url": "/assets/packages/@elements/utils/1.0.0-
alpha.18/index.js?version=c7aeecbe2385dc132d48",
          "version": "c7aeecbe2385dc132d48",
          "size": 24865,
          "source": "packages/@elements/utils/1.0.0-alpha.18/index.js"
        },
        {
          "url": "/assets/packages/@elements/json/1.0.0
alpha.18/index.js?version=c7efa6e046ddf137b611",
          "version": "c7efa6e046ddf137b611",
          "size": 33421,
          "source": "packages/@elements/json/1.0.0-alpha.18/index.js"
        },
```

```
        {
            "url": "/assets/packages/path-to-
regexp/6.1.0/dist/index.js?version=d3dcf60780e2c4c27665",
            "version": "d3dcf60780e2c4c27665",
            "size": 19157,
            "source": "packages/path-to-regexp/6.1.0/dist/index.js"
        },
        {
            "url": "/assets/packages/object-
assign/4.1.1/index.js?version=54ec954fe8966ae64148",
            "version": "54ec954fe8966ae64148",
            "size": 3601,
            "source": "packages/object-assign/4.1.1/index.js"
        },
        {
            "url": "/assets/packages/prop-
types/15.7.2/checkPropTypes.js?version=577dc59de2094a2144b6",
            "version": "577dc59de2094a2144b6",
            "size": 6164,
            "source": "packages/prop-types/15.7.2/checkPropTypes.js"
        },
        {
            "url":
"/assets/packages/react/16.13.1/index.js?version=f75cf24333c62dd89c54",
            "version": "f75cf24333c62dd89c54",
            "size": 85159,
            "source": "packages/react/16.13.1/index.js"
        },
        {
            "url":
"/assets/packages/scheduler/0.19.1/index.js?version=42707b96144227a9ffae",
            "version": "42707b96144227a9ffae",
            "size": 37675,
            "source": "packages/scheduler/0.19.1/index.js"
        },
        {
            "url":
"/assets/packages/scheduler/0.19.1/tracing.js?version=9fbe1c6bf4b986c7ec0b",
            "version": "9fbe1c6bf4b986c7ec0b",
            "size": 14391,
            "source": "packages/scheduler/0.19.1/tracing.js"
        },
        {
            "url": "/assets/packages/react-
dom/16.13.1/index.js?version=752b31a5a81a3ae7c7b7",
            "version": "752b31a5a81a3ae7c7b7",
            "size": 1190470,
            "source": "packages/react-dom/16.13.1/index.js"
        },
        {
            "url":
"/assets/packages/querystringify/2.1.1/index.js?version=91d11d80a7336d4ccf35"
,
            "version": "91d11d80a7336d4ccf35",
            "size": 4344,
            "source": "packages/querystringify/2.1.1/index.js"
        },
```

```
            {
                "url": "/assets/packages/requires-
port/1.0.0/index.js?version=f2302565d0e69290b572",
                "version": "f2302565d0e69290b572",
                "size": 1786,
                "source": "packages/requires-port/1.0.0/index.js"
            },
            {
                "url": "/assets/packages/url-
parse/1.4.7/index.js?version=8efd196a46c8e6e55f15",
                "version": "8efd196a46c8e6e55f15",
                "size": 17369,
                "source": "packages/url-parse/1.4.7/index.js"
            },
            {
                "url":
"/assets/packages/ms/2.1.2/index.js?version=54e12330d0aef13cfa5c",
                "version": "54e12330d0aef13cfa5c",
                "size": 5222,
                "source": "packages/ms/2.1.2/index.js"
            },
            {
                "url":
"/assets/packages/debug/4.1.1/src/browser.js?version=3e7c5e3573ef430fbd91",
                "version": "3e7c5e3573ef430fbd91",
                "size": 17372,
                "source": "packages/debug/4.1.1/src/browser.js"
            },
            {
                "url":
"/assets/packages/@elements/application/0.0.0/index.js?version=4694ce411e4c3b
e0c357",
                "version": "4694ce411e4c3be0c357",
                "size": 128959,
                "source": "packages/@elements/application/0.0.0/index.js"
            },
            {
                "url": "/assets/index.js?version=86b7a215993f17631e47",
                "version": "86b7a215993f17631e47",
                "size": 11846,
                "source": "project/index.ts"
            }
        ],
        "style": [],
        "assets": []
    },
    "boot": {
      "version": "f93c7144744993b0dbc8",
      "size": 22098,
      "gzipSize": 4345,
      "code": [
        {
          "url": "/assets/loader.js?version=315c09152b035f4288d4",
          "version": "315c09152b035f4288d4",
          "size": 14012
        },
        {
```

```
          "url": "/assets/bundle.js?version=18f53fcb844b06ce3bcb",
          "version": "18f53fcb844b06ce3bcb",
          "size": 8086
        }
      ],
      "style": [],
      "assets": []
    },
    "project/app/pages/home/index.tsx": {
      "root": "project/app/pages/home/index.tsx",
      "version": "321057dc4ee727e499fd",
      "size": 97446,
      "gzipSize": 24516,
      "code": [
        {
          "url": "/assets/packages/object-assign/4.1.1/index.js?version=54ec954fe8966ae64148",
          "version": "54ec954fe8966ae64148",
          "size": 3601,
          "source": "packages/object-assign/4.1.1/index.js"
        },
        {
          "url": "/assets/packages/prop-types/15.7.2/checkPropTypes.js?version=577dc59de2094a2144b6",
          "version": "577dc59de2094a2144b6",
          "size": 6164,
          "source": "packages/prop-types/15.7.2/checkPropTypes.js"
        },
        {
          "url": "/assets/packages/react/16.13.1/index.js?version=f75cf24333c62dd89c54",
          "version": "f75cf24333c62dd89c54",
          "size": 85159,
          "source": "packages/react/16.13.1/index.js"
        },
        {
          "url": "/assets/app/pages/home/index.js?version=1100027294d4d2610768",
          "version": "1100027294d4d2610768",
          "size": 2259,
          "source": "project/app/pages/home/index.tsx"
        }
      ],
      "style": [
        {
          "url": "/assets/app/pages/home/index.css?version=fe841bd5d8d644ec2624",
          "version": "fe841bd5d8d644ec2624",
          "size": 263,
          "source": "project/app/pages/home/index.tsx"
        }
      ],
      "assets": []
    },
    "project/app/pages/not-found/index.tsx": {
      "root": "project/app/pages/not-found/index.tsx",
      "version": "7b85dbd89372a32b943b",
```

```
          "size": 97597,
          "gzipSize": 24502,
          "code": [
            {
              "url": "/assets/packages/object-
assign/4.1.1/index.js?version=54ec954fe8966ae64148",
              "version": "54ec954fe8966ae64148",
              "size": 3601,
              "source": "packages/object-assign/4.1.1/index.js"
            },
            {
              "url": "/assets/packages/prop-
types/15.7.2/checkPropTypes.js?version=577dc59de2094a2144b6",
              "version": "577dc59de2094a2144b6",
              "size": 6164,
              "source": "packages/prop-types/15.7.2/checkPropTypes.js"
            },
            {
              "url":
"/assets/packages/react/16.13.1/index.js?version=f75cf24333c62dd89c54",
              "version": "f75cf24333c62dd89c54",
              "size": 85159,
              "source": "packages/react/16.13.1/index.js"
            },
            {
              "url": "/assets/app/pages/not-
found/index.js?version=511ac6c6a0ef74368e5a",
              "version": "511ac6c6a0ef74368e5a",
              "size": 2538,
              "source": "project/app/pages/not-found/index.tsx"
            }
          ],
          "style": [
            {
              "url": "/assets/app/pages/not-
found/index.css?version=bb62c25975dc7e1b4b84",
              "version": "bb62c25975dc7e1b4b84",
              "size": 135,
              "source": "project/app/pages/not-found/index.tsx"
            }
          ],
          "assets": []
        },
        "project/app/pages/unhandled/index.tsx": {
          "root": "project/app/pages/unhandled/index.tsx",
          "version": "6633e78660d274998cd6",
          "size": 97620,
          "gzipSize": 24499,
          "code": [
            {
              "url": "/assets/packages/object-
assign/4.1.1/index.js?version=54ec954fe8966ae64148",
              "version": "54ec954fe8966ae64148",
              "size": 3601,
              "source": "packages/object-assign/4.1.1/index.js"
            },
            {
```

```
            "url": "/assets/packages/prop-
types/15.7.2/checkPropTypes.js?version=577dc59de2094a2144b6",
            "version": "577dc59de2094a2144b6",
            "size": 6164,
            "source": "packages/prop-types/15.7.2/checkPropTypes.js"
          },
          {
            "url":
"/assets/packages/react/16.13.1/index.js?version=f75cf24333c62dd89c54",
            "version": "f75cf24333c62dd89c54",
            "size": 85159,
            "source": "packages/react/16.13.1/index.js"
          },
          {
            "url":
"/assets/app/pages/unhandled/index.js?version=5a68c1e4dd40aad7e7bb",
            "version": "5a68c1e4dd40aad7e7bb",
            "size": 2561,
            "source": "project/app/pages/unhandled/index.tsx"
          }
        ],
        "style": [
          {
            "url":
"/assets/app/pages/unhandled/index.css?version=0f1d6803376acc82fd19",
            "version": "0f1d6803376acc82fd19",
            "size": 135,
            "source": "project/app/pages/unhandled/index.tsx"
          }
        ],
        "assets": []
      }
    }
  },
  "main": {
    "files": {
      "app/.gitkeep": {
        "version": "53d1af2cf12fefde1446",
        "size": 0,
        "source": "project/app/.gitkeep"
      },
      "app/config/browser.js": {
        "version": "ddde84e5bb22d0f2c8e2",
        "size": 277,
        "source": "project/app/config/browser.ts"
      },
      "app/config/browser.js.map": {
        "version": "ddde84e5bb22d0f2c8e2",
        "size": 380,
        "source": "project/app/config/browser.ts"
      },
      "app/config/index.js": {
        "version": "78282709523ca638935c",
        "size": 527,
        "source": "project/app/config/index.ts"
      },
      "app/config/index.js.map": {
```

```
    "version": "78282709523ca638935c",
    "size": 804,
    "source": "project/app/config/index.ts"
},
"app/index.js": {
    "version": "8e0fa209848ac220ba75",
    "size": 852,
    "source": "project/app/index.ts"
},
"app/index.js.map": {
    "version": "8e0fa209848ac220ba75",
    "size": 1439,
    "source": "project/app/index.ts"
},
"app/pages/.gitkeep": {
    "version": "53d1af2cf12fefde1446",
    "size": 0,
    "source": "project/app/pages/.gitkeep"
},
"app/pages/home/index.css": {
    "version": "d412e9831b5ccf1fee90",
    "size": 138,
    "source": "project/app/pages/home/index.scss"
},
"app/pages/home/index.css.map": {
    "version": "d412e9831b5ccf1fee90",
    "size": 367,
    "source": "project/app/pages/home/index.scss"
},
"app/pages/home/index.js": {
    "version": "e71ab1cd780c46ee7f2b",
    "size": 1182,
    "source": "project/app/pages/home/index.tsx"
},
"app/pages/home/index.js.map": {
    "version": "e71ab1cd780c46ee7f2b",
    "size": 742,
    "source": "project/app/pages/home/index.tsx"
},
"app/pages/not-found/index.css": {
    "version": "b1d6053a990b0dcb9d22",
    "size": 0,
    "source": "project/app/pages/not-found/index.scss"
},
"app/pages/not-found/index.css.map": {
    "version": "b1d6053a990b0dcb9d22",
    "size": 154,
    "source": "project/app/pages/not-found/index.scss"
},
"app/pages/not-found/index.js": {
    "version": "7e589774f94e457622e4",
    "size": 1396,
    "source": "project/app/pages/not-found/index.tsx"
},
"app/pages/not-found/index.js.map": {
    "version": "7e589774f94e457622e4",
    "size": 906,
```

```
    "source": "project/app/pages/not-found/index.tsx"
},
"app/pages/unhandled/index.css": {
    "version": "92211f3bf8f530cfff75",
    "size": 0,
    "source": "project/app/pages/unhandled/index.scss"
},
"app/pages/unhandled/index.css.map": {
    "version": "92211f3bf8f530cfff75",
    "size": 154,
    "source": "project/app/pages/unhandled/index.scss"
},
"app/pages/unhandled/index.js": {
    "version": "97a8e449710a2bb906f3",
    "size": 1419,
    "source": "project/app/pages/unhandled/index.tsx"
},
"app/pages/unhandled/index.js.map": {
    "version": "97a8e449710a2bb906f3",
    "size": 929,
    "source": "project/app/pages/unhandled/index.tsx"
},
"app/routes/.gitkeep": {
    "version": "53d1af2cf12fefde1446",
    "size": 0,
    "source": "project/app/routes/.gitkeep"
},
"app/routes/api/v1/index.js": {
    "version": "f3a2d7d986cf62a5d38f",
    "size": 3695,
    "source": "project/app/routes/api/v1/index.ts"
},
"app/routes/api/v1/index.js.map": {
    "version": "f3a2d7d986cf62a5d38f",
    "size": 1334,
    "source": "project/app/routes/api/v1/index.ts"
},
"app/routes/main/index.js": {
    "version": "9764e8d643cd98d79e8f",
    "size": 3006,
    "source": "project/app/routes/main/index.ts"
},
"app/routes/main/index.js.map": {
    "version": "9764e8d643cd98d79e8f",
    "size": 655,
    "source": "project/app/routes/main/index.ts"
},
"app/services/main/index.js": {
    "version": "60aa1ed9e69b01a601c0",
    "size": 2873,
    "source": "project/app/services/main/index.ts"
},
"app/services/main/index.js.map": {
    "version": "60aa1ed9e69b01a601c0",
    "size": 335,
    "source": "project/app/services/main/index.ts"
},
```

```
"app/shared/.gitkeep": {
  "version": "53d1af2cf12fefde1446",
  "size": 0,
  "source": "project/app/shared/.gitkeep"
},
"app/shared/components/.gitkeep": {
  "version": "53d1af2cf12fefde1446",
  "size": 0,
  "source": "project/app/shared/components/.gitkeep"
},
"app/shared/images/.gitkeep": {
  "version": "53d1af2cf12fefde1446",
  "size": 0,
  "source": "project/app/shared/images/.gitkeep"
},
"app/shared/styles/.gitkeep": {
  "version": "53d1af2cf12fefde1446",
  "size": 0,
  "source": "project/app/shared/styles/.gitkeep"
},
"app/shared/utils/.gitkeep": {
  "version": "53d1af2cf12fefde1446",
  "size": 0,
  "source": "project/app/shared/utils/.gitkeep"
},
"app/shared/utils/index.js": {
  "version": "a806dfd2ffab9844bf15",
  "size": 198,
  "source": "project/app/shared/utils/index.ts"
},
"app/shared/utils/index.js.map": {
  "version": "a806dfd2ffab9844bf15",
  "size": 250,
  "source": "project/app/shared/utils/index.ts"
},
"config/.gitkeep": {
  "version": "53d1af2cf12fefde1446",
  "size": 0,
  "source": "project/config/.gitkeep"
},
"config/build.json": {
  "version": "3d4e1f06bda314c7e9b8",
  "size": 100,
  "source": "project/config/build.json"
},
"config/hot": {
  "version": "53d1af2cf12fefde1446",
  "size": 0,
  "source": "project/config/hot"
},
"config/migrations/.gitkeep": {
  "version": "53d1af2cf12fefde1446",
  "size": 0,
  "source": "project/config/migrations/.gitkeep"
},
"config/migrations/2020-07-07-184136132.js": {
  "version": "f7f47db131b95c917f94",
```

```
    "size": 387,
    "source": "project/config/migrations/2020-07-07-184136132.ts"
  },
  "config/migrations/2020-07-07-184136132.js.map": {
    "version": "f7f47db131b95c917f94",
    "size": 571,
    "source": "project/config/migrations/2020-07-07-184136132.ts"
  },
  "config/migrations/2020-07-07-184157366.js": {
    "version": "c0bc9903f90537709a62",
    "size": 388,
    "source": "project/config/migrations/2020-07-07-184157366.ts"
  },
  "config/migrations/2020-07-07-184157366.js.map": {
    "version": "c0bc9903f90537709a62",
    "size": 572,
    "source": "project/config/migrations/2020-07-07-184157366.ts"
  },
  "config/migrations/2020-07-07-184212674.js": {
    "version": "45a01737d285a4280a64",
    "size": 391,
    "source": "project/config/migrations/2020-07-07-184212674.ts"
  },
  "config/migrations/2020-07-07-184212674.js.map": {
    "version": "45a01737d285a4280a64",
    "size": 575,
    "source": "project/config/migrations/2020-07-07-184212674.ts"
  },
  "config/transforms.js": {
    "version": "9c07e3cca014b37e8635",
    "size": 595,
    "source": "project/config/transforms.ts"
  },
  "config/transforms.js.map": {
    "version": "9c07e3cca014b37e8635",
    "size": 711,
    "source": "project/config/transforms.ts"
  },
  "config/tsconfig.json": {
    "version": "bd01e7cbaa4a089225dd",
    "size": 31,
    "source": "project/config/tsconfig.json"
  },
  "index.js": {
    "version": "cafb08fdc906bfe09f9b",
    "size": 227,
    "source": "project/index.ts"
  },
  "index.js.map": {
    "version": "cafb08fdc906bfe09f9b",
    "size": 259,
    "source": "project/index.ts"
  },
  "package.json": {
    "version": "596ffe7fcce62cb13b71",
    "size": 259,
    "source": "project/package.json"
```

```
      },
      "yarn.lock": {
        "version": "bca36af9b758816682f5",
        "size": 3722,
        "source": "project/yarn.lock"
      }
    },
    "sources": {
      "project/app/.gitkeep": "app/.gitkeep",
      "project/app/config/browser.ts": "app/config/browser.js",
      "project/app/config/index.ts": "app/config/index.js",
      "project/app/index.ts": "app/index.js",
      "project/app/pages/.gitkeep": "app/pages/.gitkeep",
      "project/app/pages/home/index.scss": "app/pages/home/index.css",
      "project/app/pages/home/index.tsx": "app/pages/home/index.js",
      "project/app/pages/not-found/index.scss": "app/pages/not-found/index.css",
      "project/app/pages/not-found/index.tsx": "app/pages/not-found/index.js",
      "project/app/pages/unhandled/index.scss": "app/pages/unhandled/index.css",
      "project/app/pages/unhandled/index.tsx": "app/pages/unhandled/index.js",
      "project/app/routes/.gitkeep": "app/routes/.gitkeep",
      "project/app/routes/api/v1/index.ts": "app/routes/api/v1/index.js",
      "project/app/routes/main/index.ts": "app/routes/main/index.js",
      "project/app/services/main/index.ts": "app/services/main/index.js",
      "project/app/shared/.gitkeep": "app/shared/.gitkeep",
      "project/app/shared/components/.gitkeep": "app/shared/components/.gitkeep",
      "project/app/shared/images/.gitkeep": "app/shared/images/.gitkeep",
      "project/app/shared/styles/.gitkeep": "app/shared/styles/.gitkeep",
      "project/app/shared/utils/.gitkeep": "app/shared/utils/.gitkeep",
      "project/app/shared/utils/index.ts": "app/shared/utils/index.js",
      "project/config/.gitkeep": "config/.gitkeep",
      "project/config/build.json": "config/build.json",
      "project/config/hot": "config/hot",
      "project/config/migrations/.gitkeep": "config/migrations/.gitkeep",
      "project/config/migrations/2020-07-07-184136132.ts": "config/migrations/2020-07-07-184136132.js",
      "project/config/migrations/2020-07-07-184157366.ts": "config/migrations/2020-07-07-184157366.js",
      "project/config/migrations/2020-07-07-184212674.ts": "config/migrations/2020-07-07-184212674.js",
      "project/config/transforms.ts": "config/transforms.js",
      "project/config/tsconfig.json": "config/tsconfig.json",
      "project/index.ts": "index.js",
      "project/package.json": "package.json",
      "project/yarn.lock": "yarn.lock"
    }
   }
  }
}
```

What is claimed is:

1. A computer-implemented method comprising:
receiving, by a computing device, a request to create a software application for a plurality of targets from a source project folder including one or more source files;
scanning, by the computing device, the source project folder to generate a source graph representing file dependencies within the one or more files in the source project folder;
compiling, by the computing device, the one or more files in the source project folder to generate compiled code for each of the plurality of targets using the source graph;
linking and writing, by the computing device, the compiled code as linked files or written files for one or more of the plurality of targets;
writing, by the computing device, the distribution manifest file to a build directory, the distribution manifest file including the linked or written files; and
monitoring, by the computing device, for one or more file change events by performing a diff of files in the distribution manifest file with files in a loader cache to determine changed files and, as a result of detecting one or more file change events, deleting the changed files from the loader cache and reloading the changed files.

2. The method of claim 1, wherein the plurality of targets includes one browser target and one server target.

3. The method of claim 1, wherein the source project folder is a single code source tree.

4. The method of claim 1, wherein the source project folder includes all source files to generate compiled code for each of the plurality of targets.

5. The method of claim 1, wherein the source graph comprises one or more edges for maintaining one or more target dependencies and one or more import redirects.

6. The method of claim 1, wherein scanning is performed using a dependency parser that parses dependency statements in the one or more files in the source project folder.

7. The method of claim 6, wherein scanning the source project folder to generate a source graph comprises crawling the one or more source files in parallel for each target using a shared queue.

8. The method of claim 1, wherein compiling the one or more files in the source project folder to generate compiled code includes running an abstract syntax tree transform for the one or more files in the source project folder.

9. The method of claim 1, wherein compiling the one or more files in the source project folder to generate compiled code is performed automatically in topological order.

10. The method of claim 1, wherein compiling is performed using a pluggable compiler framework.

11. The method of claim 1, further comprising creating at least one bundle for one of the plurality of targets by:
determining resources for loading the application;
automatically splitting the application into pages; and
creating a bundle for each of the pages.

12. The method of claim 1, wherein monitoring for the one or more file change events further comprises:
determining the changed files by performing a diff of files in a virtual file tree against files stored on disk; and
generating the one or more file change events for each of the changed files.

13. The method of claim 1, further comprising
reloading the changed files without restarting a process.

14. The method of claim 1, wherein the linked files comprise a plurality of files combined into a single file and the written files are binary data.

15. A system comprising:
one or more processors; and
memory storing instructions that, when executed, cause the system to perform operations comprising:
receiving a request to create a software application for a plurality of targets from a source project folder including one or more source files;
scanning the one or more source files in the source project folder to generate a source graph representing file dependencies within the one or more source files in the source folder;
compiling the one or more source files in the source project folder to generate compiled code for each of the plurality of targets using the source graph;
linking and writing the compiled code as linked files or written files for one or more of the plurality of targets;
writing the distribution manifest file to a build directory, the distribution manifest file including the linked or written files; and
monitoring for one or more file change events by performing a diff of files in the distribution manifest file with files in a loader cache to determine changed files and, as a result of detecting one or more file change events, deleting the changed files from the loader cache and reloading the changed files.

16. The system of claim 15 wherein the plurality of targets includes one browser target and one server target.

17. The system of claim 15 wherein the source project folder comprises all source assets to generate the plurality of distribution files for the plurality of targets.

18. The system of claim 15 wherein the source graph comprises one or more edges for maintaining one or more target dependencies and one or more import redirects.

19. The system of claim 15 wherein the memory comprises instructions that, when executed, further cause the system to perform operations comprising:
determining the changed files by performing a diff of files in a virtual file tree against files stored on disk;
generating the one or more file change events for each of the changed files; and
reloading the changed files without restarting a process.

20. The system of claim 15 wherein the memory comprises instructions that, when executed, further cause the system to
reload the changed files without restarting a process.

* * * * *